(12) United States Patent
Matsumoto

(10) Patent No.: US 12,313,159 B2
(45) Date of Patent: May 27, 2025

(54) TRANSMISSION AND UTILITY VEHICLE WITH TRANSMISSION

(71) Applicant: KAWASAKI MOTORS, LTD, Hyogo (JP)

(72) Inventor: Kazuho Matsumoto, Akashi (JP)

(73) Assignee: KAWASAKI MOTORS, LTD., Hyogo (JP)

(\*) Notice: Subject to any disclaimer, the term of this patent is extended or adjusted under 35 U.S.C. 154(b) by 0 days.

(21) Appl. No.: 18/199,437

(22) Filed: May 19, 2023

(65) Prior Publication Data

US 2024/0384786 A1 Nov. 21, 2024

(51) Int. Cl.
  *F16H 61/30* (2006.01)
  *F16H 61/688* (2006.01)
  *F16H 63/30* (2006.01)
  *F16H 63/32* (2006.01)

(52) U.S. Cl.
  CPC .......... *F16H 61/30* (2013.01); *F16H 61/688* (2013.01); *F16H 63/3026* (2013.01); *F16H 63/32* (2013.01); *F16H 2200/0056* (2013.01); *F16H 2200/006* (2013.01)

(58) Field of Classification Search
  CPC .... F16H 61/30; F16H 61/688; F16H 63/3026; F16H 63/32; F16H 2200/0056; F16H 2200/006; F16H 3/006

USPC .................................................. 74/330, 664
See application file for complete search history.

(56) References Cited

U.S. PATENT DOCUMENTS

| 7,946,953 | B2 | 5/2011 | Koga et al. | |
| 8,082,817 | B2* | 12/2011 | Takahara | F16D 11/10 |
| | | | | 192/69.71 |
| 8,978,500 | B2* | 3/2015 | Yagi | F16H 61/143 |
| | | | | 74/473.11 |
| 9,377,102 | B2* | 6/2016 | Yoshimura | F16H 61/12 |
| 2024/0209937 | A1* | 6/2024 | Mizuno | F16H 63/18 |

\* cited by examiner

*Primary Examiner* — Victor L Macarthur
(74) *Attorney, Agent, or Firm* — Wenderoth, Lind & Ponack, L.L.P.

(57) ABSTRACT

A transmission includes an input shaft, an output shaft, a clutch that connects and disconnects power from a drive source input to the input shaft, a plurality of gear trains for gear positions provided between input and output shafts, a plurality of switching valves that switch an oil passage connected to a hydraulic chamber to which hydraulic pressure that brings each of a plurality of the gear trains for gear positions into a power transmittable state is supplied, and a controller that controls a plurality of the switching valves. The controller controls a plurality of the switching valves to selectively switch a plurality of hydraulic pressure supply patterns for supplying hydraulic pressure to hydraulic chamber of the gear train for a gear position. Hydraulic pressure is supplied to the hydraulic chamber of at least one of the gear trains for gear positions through at least two of the switching valves.

13 Claims, 12 Drawing Sheets

| HYDRAULIC PRESSURE SUPPLY PATTERN | GEAR POSITION MODE | FIRST CONTROL VALVE | SECOND CONTROL VALVE | THIRD CONTROL VALVE |
|---|---|---|---|---|
| 1 | FIRST GEAR—SECOND GEAR | ON | OFF | ON |
| 2 | SECOND GEAR—THIRD GEAR | OFF | OFF | ON |
| 3 | THIRD GEAR—FOURTH GEAR | OFF | OFF | OFF |
| 4 | FOURTH GEAR—FIFTH GEAR | ON | OFF | OFF |
| 5 | FIFTH GEAR—SIXTH GEAR | ON | ON | OFF |
| 6 | SIXTH GEAR—SEVENTH GEAR | OFF | ON | OFF |
| 7 | SEVENTH GEAR—EIGHTH GEAR | OFF | ON | ON |

TRANSMISSION AND UTILITY VEHICLE WITH TRANSMISSION

BACKGROUND OF THE INVENTION

Technical Field

The present disclosure relates to a transmission and a utility vehicle with a transmission.

Related Art

As described in U.S. Pat. No. 7,946,953, a utility vehicle may include a dual clutch transmission as a transmission that automatically changes speed of power input from a drive source. A dual clutch transmission includes two clutches, and is configured to change speed by alternately switching between an odd-numbered gear position and an even-numbered gear position.

SUMMARY

In a transmission mounted on a utility vehicle, in order to automatically move a meshing clutch (dog clutch) for switching a gear position, hydraulic pressure may be used in order to, for example, reduce cost as compared with a case of using an electric actuator such as a motor for rotationally driving a shift drum. For the transmission, a multistage transmission is desired, and it is desired to further reduce cost even in a case of using hydraulic pressure.

An object of the present disclosure is to reduce cost in a transmission of a utility vehicle.

In order to achieve the above object, the present disclosure provides a transmission including an input shaft, an output shaft disposed in parallel to the input shaft, a clutch for connecting and disconnecting power from a drive source input to the input shaft, a plurality of gear trains for gear positions provided between the input shaft and the output shaft, a plurality of switching valves for switching an oil passage connected to a hydraulic chamber to which hydraulic pressure for bringing each of a plurality of the gear trains for gear positions into a power transmittable state is supplied, and a controller for controlling a plurality of the switching valves. The controller controls a plurality of the switching valves so as to selectively switch a plurality of hydraulic pressure supply patterns for supplying hydraulic pressure to a hydraulic chamber of the gear train for a gear position, and hydraulic pressure is supplied to a hydraulic chamber of at least one of the gear trains for gear positions through at least two of the switching valves.

According to the present disclosure, the transmission including the clutch and a plurality of the gear trains for gear positions provided between the input shaft and the output shaft is provided with a plurality of the switching valves that switch the oil passage connected to the hydraulic chamber to which hydraulic pressure for bringing the gear trains for gear positions into a power transmittable state is supplied, and a plurality of the switching valves are controlled to selectively switch a plurality of hydraulic pressure supply patterns. By the above, by bringing the gear trains for gear positions into a power transmission state by using hydraulic pressure, it is possible to reduce cost as compared with a case of using an electric actuator such as a motor. Further, since hydraulic pressure is supplied to the hydraulic chamber of at least one of the gear trains for gear positions through at least two of the switching valves, it is possible to reduce the number of switching valves and reduce cost as compared with a case where a switching valve is provided for each hydraulic chamber of a gear train for a gear position.

The present disclosure also provides a utility vehicle with a transmission including an input shaft, an output shaft disposed in parallel to the input shaft, a clutch for connecting and disconnecting power from a drive source input to the input shaft, a plurality of gear trains fox gear positions provided between the input shaft and the output shaft, a plurality of switching valves for switching an oil passage connected to a hydraulic chamber to which hydraulic pressure for bringing each of a plurality of the gear trains for gear positions into a power transmittable state is supplied, and a controller for controlling a plurality of the switching valves. The controller controls a plurality of the switching valves so as to selectively switch a plurality of hydraulic pressure supply patterns for supplying hydraulic pressure to a hydraulic chamber of the gear train for a gear position, and hydraulic pressure is supplied to a hydraulic chamber of at least one of the gear trains for gear positions through at least two of the switching valves.

According to the present disclosure, the transmission of a utility vehicle including the clutch and a plurality of the gear trains for gear positions provided between the input shaft and the output shaft is provided with a plurality of the switching valves that switch the oil passage connected to the hydraulic chamber to which hydraulic pressure for bringing the gear trains for gear positions into a power transmittable state is supplied, and a plurality of the switching valves are controlled to selectively switch a plurality of hydraulic pressure supply patterns. By the above, by bringing the gear trains for gear positions into a power transmission state by using hydraulic pressure, it is possible to reduce cost as compared with a case of using an electric actuator such as a motor. Further, since hydraulic pressure is supplied to the hydraulic chamber of at least one of the gear trains for gear positions through at least two of the switching valves, it is possible to reduce the number of switching valves and reduce cost as compared with a case where a switching valve is provided for each hydraulic chamber of a gear train for a gear position.

BRIEF DESCRIPTION OF THE DRAWINGS

The foregoing and the other features of the present invention will become apparent from the following description and drawings of an illustrative embodiment of the invention in which:

FIG. 2 is a schematic configuration diagram of a transmission of the utility vehicle;

FIG. 5 is an explanatory diagram for explaining a hydraulic pressure supply pattern;

DETAILED DESCRIPTION OF EMBODIMENTS

Hereinafter, a utility vehicle according to an embodiment of the present invention will be described with reference to the accompanying drawings. The utility vehicle is mainly a vehicle for traveling not only on grassland, gravel, and sand, but also on unpaved mountain roads and forest roads, and off-road places, such as muddy and rocky lands. Note that, in the present description, "front", "rear", "left", and "right" refer to a front direction, a rear direction, a left direction, and a right direction as viewed from a driver on the utility vehicle.

Figure 1:
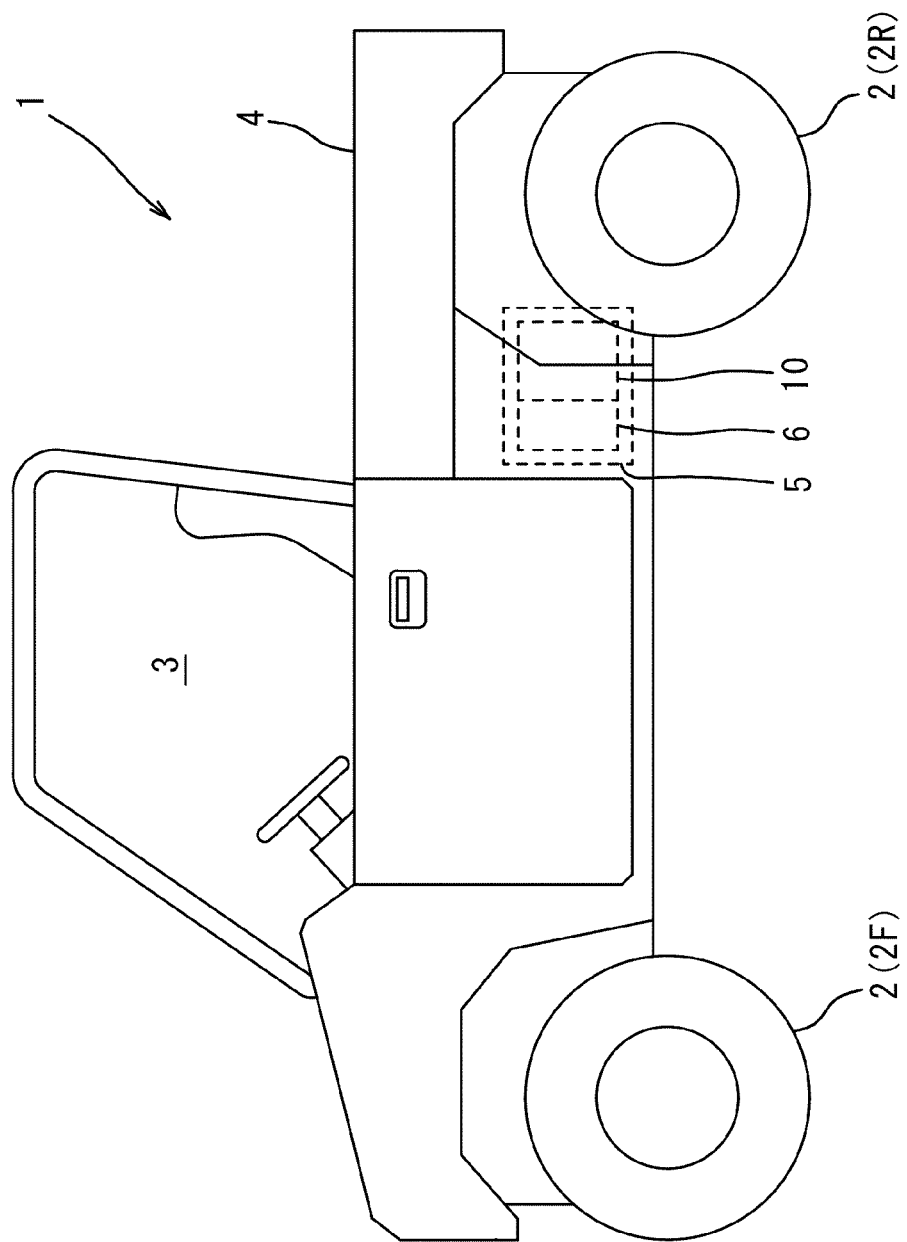
FIG. 1 is a schematic side view of a utility vehicle.

FIG. 1 is a schematic side view of a utility vehicle. As illustrated in FIG. 1, a utility vehicle 1 includes wheels 2 including left and right front wheels 2F and left and right rear wheels 2R, and a riding space (vehicle interior) 3 where passengers including a driver get in is provided between the front wheels 2F and the rear wheels 2R.

A cargo bed 4 is provided behind the riding space 3, and a power unit 5 is disposed below the cargo bed 4. The power unit 5 includes a drive source 6 and a transmission 10. The drive source 6 generates power for rotating the wheel 2. Power from the drive source 6 is transmitted to the wheel 2 via the transmission 10. An engine is used as the drive source 6. The drive source 6 may include an electric motor instead of or in addition to an engine.

Figure 2:
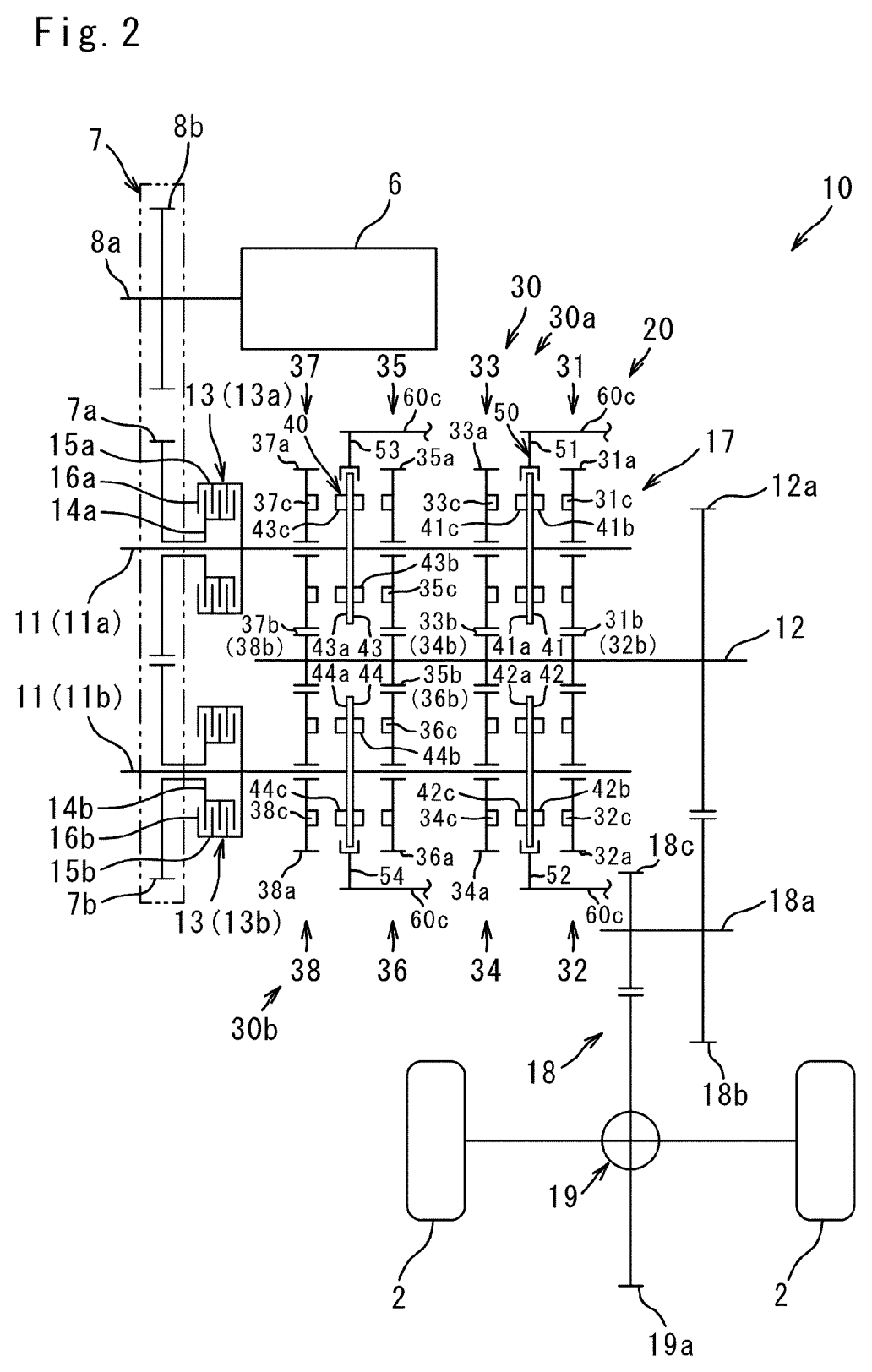

FIG. 2 is a schematic configuration diagram of a transmission of a utility vehicle. The transmission 10 is disposed on a power transmission path from the drive source 6 to the wheel 2 as a drive wheel, and is configured to shift and output power generated by the drive source 6, As illustrated in FIG. 2, the transmission 10 includes an input shaft 11 to which power from the drive source 6 is input, an output shaft 12 that is disposed in parallel with the input shaft 11 and outputs power from the drive source 6 input to the input shaft 11, a clutch 13 that connects or disconnects power from the drive source 6 input to the input shaft 11, and a plurality of gear trains 30 for gear positions provided between the input shaft 11 and the output shaft 12.

The transmission 10 is a dual clutch transmission (DCT). The input shaft 11 includes a first input shaft 11a and a second input shaft 11b. The output shaft 12 is disposed parallel to the first input shaft 11a and the second input shaft 11b. The clutch 13 includes a first clutch 13a and a second clutch 13b that connect and disconnect power from the drive source 6 input to the first input shaft 11a and the second input shaft 11b, respectively. A plurality of the gear trains 30 for gear positions include a plurality of first gear trains 30a for gear positions and second gear trains 30b for gear positions provided between the first input shaft 11a and the output shaft 12 and between the second input shaft 11b and the output shaft 12, respectively.

Power from the drive source 6 is input to the transmission 10 via a primary speed reduction mechanism 7. The primary speed reduction mechanism 7 includes an output drive gear 8b fixed to an output shaft Sa of the drive source 6, and a first input gear 1a and a second input gear 7b that are respectively disposed on axial centers of the first input shaft 11a and the second input shaft 11b and mesh with the output drive gear 8b. The primary speed reduction mechanism 7 reduces speed of and transmits rotation of the output shaft 8a of the drive source 6 to the first input gear 7a and the second input gear 7b. The output drive gear 8b may mesh with the first input gear 7a and the second input gear 7b via an intermediate gear.

As the first clutch 13a and the second clutch 13b, a wet multi-plate hydraulic clutch is used. The first clutch 13a includes an input rotary member 14a, an output rotary member 15a, a plurality of friction plates 16a disposed between the input rotary member 14a and the output rotary member 15a, a piston (not illustrated) that fastens a plurality of the friction plates 16a, a hydraulic chamber (not illustrated) to which hydraulic pressure for biasing the piston in a fastening direction of the friction plates 16a is supplied, and a return spring (not illustrated) that biases the piston in a release direction of the friction plates 16a.

The first clutch 13a is engaged when hydraulic pressure is supplied to the hydraulic chamber, and is released when hydraulic pressure is discharged from the hydraulic chamber. The input rotary member 14a of the first clutch 13a is fixed to the first input gear 7a and is rotated together with the first input gear 7a. The output rotary member 15a of the first clutch 13a is fixed to the first input shaft 11a and is rotated together with the first input shaft 11a.

The second clutch 13b includes an input rotary member 14b, an output rotary member 15b, a plurality of friction plates 16b disposed between the input rotary member 14b and the output rotary member 15b, a piston (not illustrated) that fastens a plurality of the friction plates 16b, a hydraulic chamber (not illustrated) to which hydraulic pressure for biasing the piston in a fastening direction of the friction plates 16b is supplied, and a return spring (not illustrated) that biases the piston in a release direction of the friction plates 16b.

The second clutch 13b is engaged when hydraulic pressure is supplied to the hydraulic chamber, and is released when hydraulic pressure is discharged from the hydraulic chamber. The input rotary member 14b of the second clutch 13b is fixed to the second input gear 7b and rotated together with the second input gear 7b. The output rotary member 15b of the second clutch 13b is fixed to the second input shaft 11b and rotated together with the second input shaft 11b.

The transmission 10 is configured to achieve forward eight gears. The transmission 10 includes a transmission mechanism 17 that changes speed of power from the drive source 6 input to each of the first input shaft 11a and the second input shaft 11b and outputs the power to the output shaft 12. Rotation of an output gear 12a fixed to the output shaft 12 is transmitted to an input gear 19a of a differential gear 19 via a final speed reduction mechanism 18, and is transmitted to the left and right wheels 2. The final speed reduction mechanism 18 includes a counter shaft 18a, an input gear 18b meshing with the output gear 12a of the transmission mechanism 17, and an output gear 18c meshing with the input gear 19a of the differential gear 19, and reduces speed of power from the drive source 6. A two-wheel drive four-wheel drive switching device (not illustrated) is attached to the counter shaft 18a. The two-wheel drive four-wheel drive switching device is configured to be able to switch between a two-wheel drive state in which only the rear wheel 2R is driven and a four-wheel drive state in which the rear wheel 2R and the front wheel 2F are driven.

Eight gear trains 31 to 38 for gear positions of a constantly meshing type are provided between the first input shaft 11a and the output shaft 12 and between the second input shaft 11b and the output shaft 12. Between the first input shaft 11a and the output shaft 12, there are provided the first gear trains 30a for gear positions that are gear trains for odd-numbered gear positions including a gear train 31 for a first gear position, a gear train 33 for a third gear position, a gear train 35 for a fifth gear position, and a gear train 37 for a seventh gear position. Between the second input shaft 11b and the output shaft 12, there are provided the second gear trains 30b for gear positions that are gear trains for even-numbered gear positions including a gear train 32 for a second gear position, a gear train 34 for a fourth gear position, a gear train 36 for a sixth gear position, and a gear train 38 for an eighth gear position.

The gear train 31 for a first gear position includes a driving gear 31a for a first gear rotatably supported by the first input shaft 11a and a driven gear 31b for a first gear fixed to the output shaft 12 and meshing with the driving gear 31a for a first gear. The gear train 33 for a third gear position includes a driving gear 33a for a third gear rotatably supported by the first input shaft 11a and a driven gear 33b for a third gear fixed to the output shaft 12 and meshing with the driving gear 33a for a third gear. The gear train 35 for a fifth gear position includes a driving gear 35a for a fifth gear rotatably supported by the first input shaft 11a and a driven gear 35b for a fifth gear fixed to the output shaft 12 and meshing with the driving gear 35a for a fifth gear. The gear train 37 for a seventh gear position includes a driving gear 37a for a seventh gear rotatably supported by the first input shaft 11a and a driven gear 37b for a seventh gear fixed to the output shaft 12 and meshing with the driving gear 37a for a seventh gear.

The gear train 32 for a second gear position includes a driving gear 32a for a second gear rotatably supported by the second input shaft 11b and a driven gear 32b for a second gear fixed to the output shaft 12 and meshing with the driving gear 32a for a second gear. The gear train 34 for a fourth gear position includes a driving gear 34a for a fourth gear rotatably supported by the second input shaft 11b and a driven gear 34b for a fourth gear fixed to the output shaft 12 and meshing with the driving gear 34a for a fourth gear. The gear train 36 for a sixth gear position includes a driving gear 36a for a sixth gear rotatably supported by the second input shaft 11b and a driven gear 36b for a sixth gear fixed to the output shaft 12 and meshing with the driving gear 36a for a sixth gear. The gear train 38 for an eighth gear position includes a driving gear 38a for an eighth gear rotatably supported by the second input shaft 11b and a driven gear 38b for an eighth gear fixed to the output shaft 12 and meshing with the driving gear 38a for an eighth gear. The driven gear 32b for a second gear, the driven gear 34b for a fourth gear, the driven gear 36b for a sixth gear, and the driven gear 38b for an eighth gear are also used as the driven gear 31b for a first gear, the driven gear 33b for a third gear, the driven gear 35b for a fifth gear, and the driven gear 37b for a seventh gear, respectively.

The driving gears 31a to 38a for a first to eighth gears are formed to have larger gear diameters as the gear position increases. The gear diameters of the driven gear 31b for a first gear (driven gear 32b for a second gear), the driven gear 33b for a third gear (driven gear 34b for a fourth gear), the driven gear 35b for a fifth gear (driven gear 36b for a sixth gear), and the driven gear 37b for a seventh gear (driven gear 38b for an eighth gear) are formed to have smaller gear diameters as the gear position increases. The driving gears 31a to 38a for a first to eighth gears are supported by the first input shaft 11a and the second input shaft 11b so as to be relatively rotatable by shaft bearings such as a bearing, and are held by a holder such as a snap ring so as not to be displaced in an axial direction of the first input shaft 11a and the second input shaft 11b.

The transmission 10 includes a transmission switching mechanism 20 that switches the transmission mechanism 17. The transmission switching mechanism 20 includes a meshing clutch (dog clutch) 40 that brings the gear trains 31 to 38 for gear positions into a power transmittable state, a shift fork 50 that moves the meshing clutch 40, a pressure actuator 60 (see FIG. 3) that moves the shift fork 50, and a hydraulic pressure control device 70 (see FIG. 3) that controls hydraulic pressure supplied to the pressure actuator 60.

The meshing clutch 40 includes a first meshing clutch 41 disposed between the driving gear 31a for a first gear and the driving gear 33a for a third gear, a second meshing clutch 42 disposed between the driving gear 32a for a second gear and the driving gear 34a for a fourth gear, a third meshing clutch 43 disposed between the driving gear 35a for a fifth gear and the driving gear 37a for a seventh gear, and a fourth meshing clutch 44 disposed between the driving gear 36a for a sixth gear and the driving gear 38a for an eighth gear.

The first meshing clutch 41 includes a first dog ring 41a connected to the first input shaft 11a so as to be relatively non-rotatable and relatively movable in an axial direction. The first dog ring 41a has a plurality of clutch teeth (dog teeth) 41b protruding toward the driving gear for a first gear side and a plurality of clutch teeth 41c protruding toward the driving gear for a third gear side. The driving gear 31a for a first gear has a plurality of clutch teeth 31c protruding toward the first dog ring side. The driving gear 33a for a third gear has a plurality of clutch teeth 33c protruding toward the first dog ring side.

When the clutch teeth 31c and 41b of the driving gear 31a for a first gear and the first dog ring 41a are engaged with each other, speed of rotation of the first input shaft 11a is changed via the gear train 31 for a first gear position to be in a state where power can be transmitted to the output shaft 12. When the clutch teeth 33c and 41c of the driving gear 33a for a third gear and the first dog ring 41a are engaged with each other, speed of rotation of the first input shaft 11a is changed via the gear train 33 for a third gear position to be in a state Where power can be transmitted to the output shaft 12. The first dog ring 41a is switched between a first gear engagement position and a third gear engagement position where the first dog ring 41a is engaged with the driving gear 31a for a first gear and the driving gear 33a for a third gear, respectively, and a neutral position away from the driving gear 31a for a first gear and the driving gear 33a for a third gear.

The second meshing clutch 42 includes a second dog ring 42a connected to the second input shaft 11b so as to be relatively non-rotatable and relatively movable in an axial direction. The second dog ring 42a has a plurality of clutch teeth 42b protruding toward the driving gear for a second gear side and a plurality of clutch teeth 42c protruding toward the driving gear for a fourth gear side. The driving gear 33a fox a second gear has a plurality of clutch teeth 32c protruding toward the second dog ring side. The driving gear 34a for a fourth gear has a plurality of clutch teeth 34c protruding toward the second dog ring side.

When the clutch teeth 32c and 42b of the driving gear 32a for a second gear and the second dog ring 42a are engaged with each other, speed of rotation of the second input shaft 11b is changed via the gear train 32 for a second gear position to be in a state where power can be transmitted to the output shaft 12. When the clutch teeth 34c and 42c of the driving gear 34a for a fourth gear and the second dog ring 42a are engaged with each other, speed of rotation of the second input shaft 11b is changed via the gear train 34 for a fourth gear position to be in a state where power can be transmitted to the output shaft 12. The second dog ring 42a is switched between a second gear engagement position and a fourth gear engagement position where the second dog ring 42a is engaged with the driving gear 32a for a second gear and the driving gear 34a for a fourth gear, respectively, and a neutral position away from the driving gear 32a for a second gear and the driving gear 34a for a fourth gear.

The third meshing clutch 43 includes a third dog ring 43a connected to the first input shaft 11a so as to be relatively non-rotatable and relatively movable in an axial direction. The third dog ring 43a has a plurality of clutch teeth 43b protruding toward the driving gear for a fifth gear side and a plurality of clutch teeth 43c protruding toward the driving gear for a seventh gear side. The driving gear 35a for a fifth gear has a plurality of clutch teeth 35c protruding toward the third dog ring side. The driving gear 37a for a seventh gear has a plurality of clutch teeth 37c protruding toward the third dog ring side.

When the clutch teeth 35c and 43b of the driving gear 35a for a fifth gear and the third dog ring 43a are engaged with each other, speed of rotation of the first input shaft 11a is changed via the gear train 35 for a fifth gear position to be in a state where power can be transmitted to the output shaft 12. When the clutch teeth 37c and 43c of the driving gear 37a for a seventh gear and the third dog ring 43a are engaged with each other, speed of rotation of the first input shaft 11a is changed via the gear train 37 for a seventh gear position to be in a state where power can be transmitted to the output shaft 12. The third dog ring 43a is switched between a fifth gear engagement position and a seventh gear engagement position where the third dog ring 43a is engaged with the driving gear 35a for a fifth gear and the driving gear 37a for a seventh gear, respectively, and a neutral position away from the driving gear 35a for a fifth gear and the driving gear 37a for a seventh gear.

The fourth meshing clutch 44 includes a fourth dog ring 44a connected to the second input shaft 11b so as to be relatively non-rotatable and relatively movable in an axial direction. The fourth dog ring 44a has a plurality of clutch teeth 44b protruding toward the driving gear for a sixth gear side and a plurality of clutch teeth 44c protruding toward the driving gear for an eighth gear side. The driving gear 36a for a sixth gear has a plurality of clutch teeth 36c protruding toward the fourth dog ring side. The driving gear 38a for an eighth gear has a plurality of clutch teeth 38c protruding toward the fourth dog ring side.

When the clutch teeth 36c and 44b of the driving gear 36a for a sixth gear and the fourth dog ring 44a are engaged with each other, speed of rotation of the second input shaft 11b is changed via the gear train 36 for a sixth gear position to be in a state where power can be transmitted to the output shaft 12. When the clutch teeth 38c and 44c of the driving gear 38a for an eighth gear and the fourth dog ring 44a are engaged with each other, speed of rotation of the second input shaft 11b is changed via the gear train 38 for an eighth gear position to be in a state where power can be transmitted to the output shaft 12. The fourth dog ring 44a is switched between a sixth gear engagement position and an eighth gear engagement position where the fourth dog ring 44a is engaged with the driving gear 36a for a sixth gear and the driving gear 38a for an eighth gear, respectively, and a neutral position away from the driving gear 36a for a sixth gear and the driving gear 38a for an eighth gear.

In a first gear position, the first dog ring 41a is disposed at the first gear engagement position, the third dog ring 43a is disposed at the neutral position, the gear train 31 for a first gear position is brought into a power transmittable state, the first clutch 13a is engaged, and the second clutch 13b is released. Power from the drive source 6 is input to the first input shaft 11a and output from the output shaft 12 via the gear train 31 for a first gear position.

In a second gear position, the second dog ring 42a is disposed at the second gear engagement position, the fourth dog ring 44a is disposed at the neutral position, the gear train 32 for a second gear position is brought into a power transmittable state, the second clutch 13b is engaged, and the first clutch 13a is released. Power from the drive source 6 is input to the second input shaft 11b and output from the output shaft 12 via the gear train 32 for a second gear position.

In a third gear position, the first dog ring 41a is disposed at the third gear engagement position, the third dog ring 43a is disposed at the neutral position, the gear train 33 for a third gear position is brought into a power transmittable state, the first clutch 13a is engaged, and the second clutch 13b is released. Power from the drive source 6 is input to the first input shaft 11a and output from the output shaft 12 via the gear train 33 for a third gear position.

In a fourth gear position, the second dog ring 42a is disposed at the fourth gear engagement position, the fourth dog ring 44a is disposed at the neutral position, the gear train 44 for a fourth gear position is brought into a power transmittable state, the second clutch 13b is engaged, and the first clutch 13a is released. Power from the drive source 6 is input to the second input shaft 11b and output from the output shaft 12 via the gear train 34 for a fourth gear position.

In a fifth gear position, the third dog ring 43a is disposed at the fifth gear engagement position, the first dog ring 41a is disposed at the neutral position, the gear train 35 for a fifth gear position is brought into a power transmittable state, the first clutch 13a is engaged, and the second clutch 13b is released. Power from the drive source 6 is input to the first input shaft 11a and output from the output shaft 12 via the gear train 35 for a fifth gear position.

In a sixth gear position, the fourth dog ring 44a is disposed at the sixth gear engagement position, the second dog ring 42a is disposed at the neutral position, the gear train 36 for a sixth gear position is brought into a power transmittable state, the second clutch 13b is engaged, and the first clutch 13a is released. Power from the drive source 6 is input to the second input shaft 11b and output from the output shaft 12 via the gear train 36 for a sixth gear position.

In a seventh gear position, the third dog ring 43a is disposed at the seventh gear engagement position, the first dog ring 41a is disposed at the neutral position, the gear train 37 for a seventh gear position is brought into a power transmittable state, the first clutch 13a is engaged, and the second clutch 13b is released. Power from the drive source 6 is input to the first input shaft 11a and output from the output shaft 12 via the gear train 37 for a seventh gear position.

In an eighth gear position, the fourth dog ring 44a is disposed at the eighth gear engagement position, the second dog ring 42a is disposed at the neutral position, the gear train 38 for an eighth gear position is brought into a power transmittable state, the second clutch 13b is engaged, and the first clutch 13a is released. Power from the drive source 6 is input to the second input shaft 11b and output from the output shaft 12 via the gear train 38 for an eighth gear position.

The first input shaft 11a is an odd-numbered shaft 11a forming a power transmission path of an odd-numbered gear position. The second input shaft 11b is an even-numbered shaft 11b forming a power transmission path of an even-numbered gear position. In the transmission 10, a starting gear position is set to a first gear, and a predetermined gear position is automatically selected based on a gear position map indicating a relationship between a vehicle speed, the accelerator position, and a gear position in accordance with a traveling state of the utility vehicle 1.

In the transmission 10, a state in which rotation of the odd-numbered shaft 11a is transmitted to the output shaft 12 and a state in which rotation of the even-numbered shaft 11b is transmitted to the output shaft 12 are sequentially switched so that a gear position is switched, Switching of a gear position includes shift-up for increasing an ordinal number of a gear position to decrease a reduction ratio and shift-down for decreasing an ordinal number of a gear position to increase a reduction ratio.

At the time of switching of shift-up of a gear position, the gear position is switched as engagement and release of the first clutch 13a and the second clutch 13b are switched in a state where a gear train for a gear position before and after the switching is in a power transmittable state. For example, at the time of switching from the first gear position to the second gear position, in a state where the gear train 31 for a first gear position and the gear train 32 for a second gear position are in a power transmittable state, the gear position is switched from the first gear position in which the first clutch 13a is engaged and the second clutch 13b is released to the second gear position as the first clutch 13a is released and the second clutch 13b Is engaged.

At the time of switching of shift-down of a gear position, the gear position is switched as engagement and release of the first clutch 13a and the second clutch 13b are switched in a state where a gear train for a gear position before and after the switching is in a power transmittable state. For example, at the time of switching from the second gear position to the first gear position, in a state where the gear train 32 for a second gear position and the gear train 31 for a first gear position are in a power transmittable state, the gear position is switched from the second gear position in which the first clutch 13a is released and the second clutch 13b is engaged to the second gear position as the first clutch 13a is engaged and the second clutch 13b is released.

The shift fork 50 of the transmission switching mechanism 20 includes first, second, third, and fourth shift forks 51, 52, 53, and 54 that move the first, second, third, and fourth meshing clutches 41, 42, 43, and 44, respectively. The shift forks 51 to 54 are coupled to the dog rings 41a to 44a of the meshing clutches 41 to 44, respectively. The meshing clutch 40 is moved in an axial direction of the input shaft 11 by movement of the shift fork 50. The pressure actuator 60 of the transmission switching mechanism 20 includes first, second, third, and fourth pressure actuators 61, 62, 63, and 64 that move the first, second, third, and fourth shift forks 51, 52, 53, and 54, respectively. The first to fourth pressure actuators 61 to 64 are similarly configured.

Figure 3:
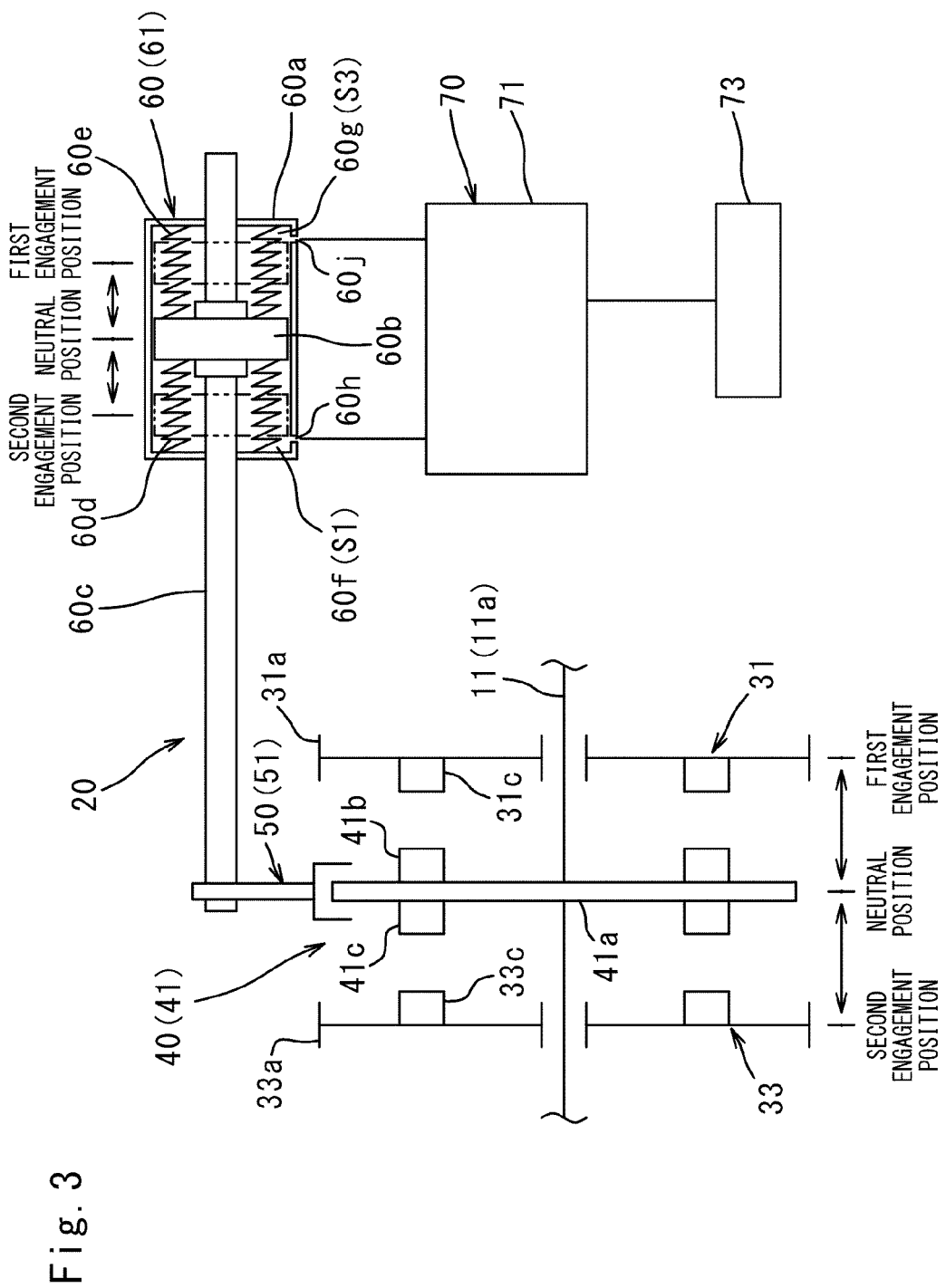
FIG. 3 is a schematic configuration diagram of a transmission switching mechanism.

FIG. 3 is a schematic configuration diagram of a transmission switching mechanism. As illustrated in FIG. 3, the transmission switching mechanism 20 includes the first meshing clutch 41 that brings the gear train 31 for a first gear position into a power transmittable state, the first shift fork 51 that moves the first meshing clutch 41, the first pressure actuator 61 that moves the first shift fork 51, and the hydraulic pressure control device 70 that controls hydraulic pressure supplied to the first pressure actuator 61.

As the first pressure actuator 61, a double-acting hydraulic cylinder 61 is used. The hydraulic cylinder 61 includes a cylinder body 60a, a piston 60b, a piston rod 60c, and springs 60d and 60e. A first hydraulic chamber 60f and a second hydraulic chamber 60g defined by the piston 60b are formed in the cylinder body 60a. The first hydraulic chamber 60f and the second hydraulic chamber 60g are provided with supply ports 60h and 60j, respectively, and are provided with the springs 60d and 60e, respectively.

In the hydraulic cylinder 61, the piston 60b is disposed at a neutral position by the springs 60d and 60e disposed on both sides when hydraulic pressure is not supplied to the first hydraulic chamber 60f and the second hydraulic chamber 60g, is disposed at a first engagement position when hydraulic pressure is supplied to the first hydraulic chamber 60f, and is disposed at a second engagement position when hydraulic pressure is supplied to the second hydraulic chamber 60g. The piston rod 60c has the piston 60b attached to a proximal end side and the shift fork 51 attached to the distal end side, and functions as a switching rod that moves the shift fork 51 as the piston 60b moves.

In the first pressure actuator 61, the first hydraulic chamber 60f is a hydraulic chamber S1 for a first gear, and the second hydraulic chamber 60g is a hydraulic Chamber S3 for a third gear. When hydraulic pressure is supplied to the hydraulic chamber S1 for a first gear, the first dog ring 41a is disposed at the first gear engagement position which is the first engagement position. When hydraulic pressure is supplied to the hydraulic chamber S3 for a third gear, the first dog ring 41a is disposed at the third gear engagement position which is the second engagement position. When no hydraulic pressure is supplied to the hydraulic chamber S1 for a first gear and the hydraulic chamber 83 for a third gear, the first dog ting 41a is disposed at a neutral position. The first pressure actuator 61 brings the gear train 31 for a first gear position and the gear train 33 for a third gear position into a non-power transmittable state when hydraulic pressure is not supplied to the hydraulic chamber S1 for a first gear and the hydraulic chamber S3 for a third gear, brings the gear train 31 for a first gear position into a power transmittable state when hydraulic pressure is supplied to the hydraulic chamber S1 for a first gear, and brings the gear train 33 for a third gear position into a power transmittable state when hydraulic pressure is supplied to the hydraulic chamber S3 for a third gear, and switches the gear trains 31 and 33 for gear positions.

As the second pressure actuator 62, a hydraulic cylinder 62 formed in a similar manner to the hydraulic cylinder 61 is used. In the hydraulic cylinder 62, the piston rod 60c has the piston 60b attached to the proximal end side and the shift fork 52 attached to the distal end side.

In the second pressure actuator 62, the first hydraulic chamber 60f is a hydraulic chamber S2 for a second gear, and the second hydraulic chamber 60g is a hydraulic chamber 84 for a fourth gear. When hydraulic pressure is supplied to the hydraulic chamber 82 for a second gear, the second dog ring 42a is disposed at the second gear engagement position. When hydraulic pressure is supplied to the hydraulic chamber S4 for a fourth gear, the second dog ring 42a is disposed at the fourth gear engagement position. When no hydraulic pressure is supplied to the hydraulic chamber 62 for a second gear and the hydraulic chamber S4 for a fourth gear, the second dog ring 42a is disposed at a neutral position. The second pressure actuator 62 brings the gear train 32 for a second gear position and the gear train 34 for a fourth gear position into a non-power transmittable state when hydraulic pressure is not supplied to the hydraulic chamber S2 for a second gear and the hydraulic chamber SA for a fourth gear, brings the gear train 32 for a second gear position into a power transmittable state when hydraulic pressure is supplied to the hydraulic chamber S2 for a second gear, and brings the gear train 34 for a fourth gear position into a power transmittable state when hydraulic pressure is supplied to the hydraulic chamber S4 for a fourth gear, and switches the gear trains 32 and 34 for gear positions.

As the third pressure actuator 63, a hydraulic cylinder 63 formed in a similar manner to the hydraulic cylinder 61 is used. In the hydraulic cylinder 63, the piston rod 60c has the piston 60b attached to the proximal end side and the shift fork 53 attached to the distal end side.

In the third pressure actuator 63, the first hydraulic chamber 60f is a hydraulic chamber S5 for a fifth gear, and the second hydraulic chamber 60g is a hydraulic chamber S7 for a seventh gear. When hydraulic pressure is supplied to the hydraulic chamber S5 for a fifth gear, the third dog ring 43a is disposed at the fifth gear engagement position. When hydraulic pressure is supplied to the hydraulic chamber 87 for a seventh gear, the third dog ring 43a is disposed at the seventh gear engagement position. When no hydraulic pressure is supplied to the hydraulic chamber S5 for a fifth gear and the hydraulic chamber S7 for a seventh gear, the third dog ring 43a is disposed at a neutral position. The third pressure actuator 63 brings the gear train 35 for a fifth gear position and the gear train 37 for a seventh gear position into a non-power transmittable state when hydraulic pressure is not supplied to the hydraulic chamber 85 for a fifth gear and the hydraulic chamber S7 for a seventh gear, brings the gear train 35 for a fifth gear position into a power transmittable state when hydraulic pressure is supplied to the hydraulic chamber S5 for a fifth gear, and brings the gear train 37 for a seventh gear position into a power transmittable state when hydraulic pressure is supplied to the hydraulic chamber S7 for a seventh gear, and switches the gear trains 35 and 37 for gear positions.

As the fourth pressure actuator 64, a hydraulic cylinder 64 formed in a similar manner to the hydraulic cylinder 61 is used. In the hydraulic cylinder 64, the piston rod 60c has the piston 60b attached to the proximal end side and the shift fork 54 attached to the distal and side.

Figure 4:
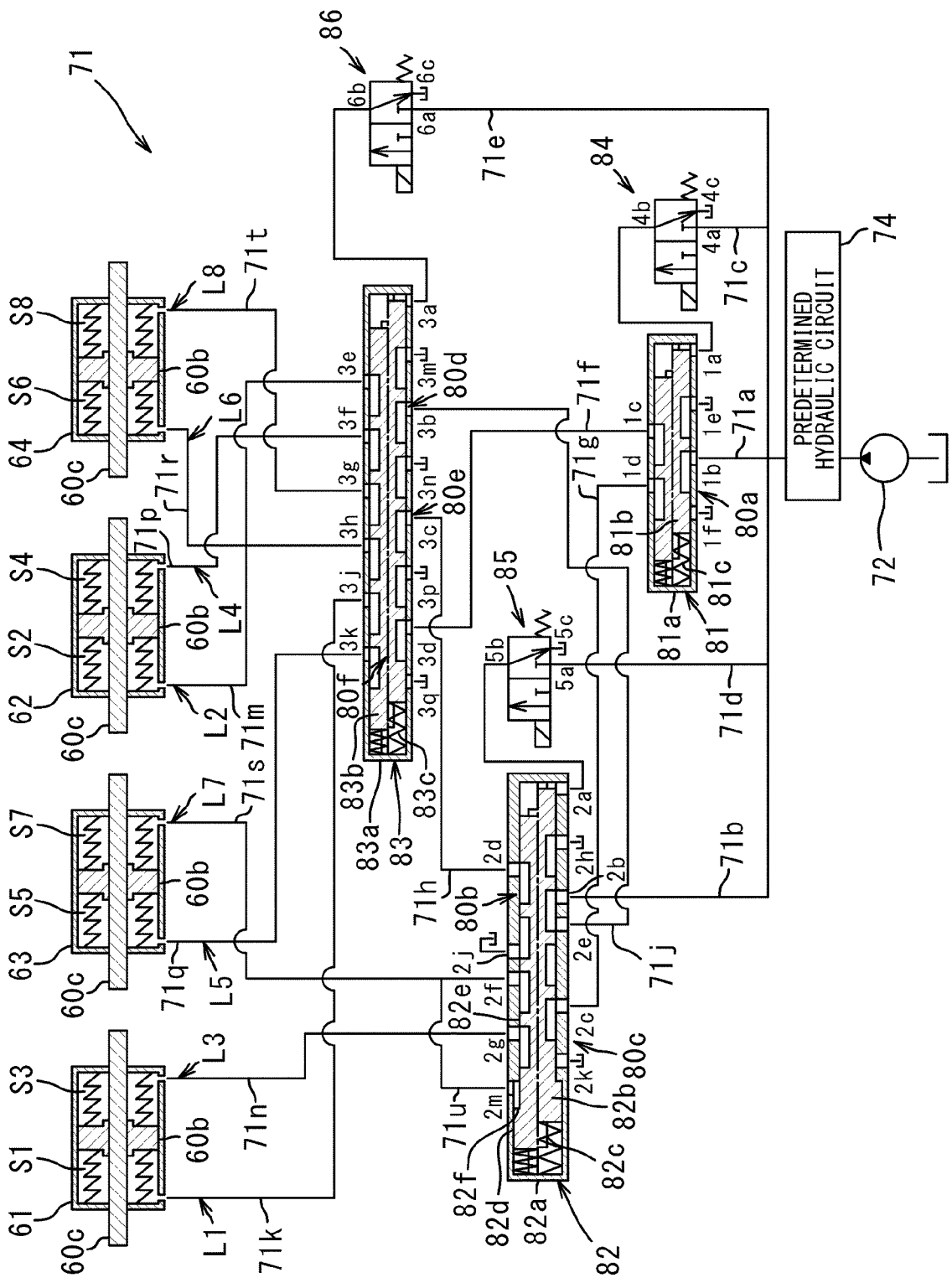
FIG. 4 is a schematic diagram of a hydraulic pressure control circuit of the transmission switching mechanism.

In the fourth pressure actuator 64, the first hydraulic chamber 60f is a hydraulic chamber S6 for a sixth gear, and the second hydraulic chamber 60g is a hydraulic chamber 88 for an eighth gear. When hydraulic pressure is supplied to the hydraulic chamber S6 for a sixth gear, the fourth dog ring 44a is disposed at the sixth gear engagement position. When hydraulic pressure is supplied to the hydraulic chamber S8 for an eighth gear, the fourth dog ring 44a is disposed at the eighth gear engagement position. When no hydraulic pressure is supplied to the hydraulic chamber S6 for a sixth gear and the hydraulic chamber S8 for an eighth gear, the fourth dog ring 44a is disposed at a neutral position. The fourth pressure actuator 64 brings the gear train 36 for a sixth gear position and the gear train 38 for an eighth gear position into a non-power transmittable state when hydraulic pressure is not supplied to the hydraulic chamber S6 for a sixth gear and the hydraulic chamber S8 for an eighth gear, brings the gear train 36 for a sixth gear position into a power transmittable state when hydraulic pressure is supplied to the hydraulic chamber S6 for a sixth gear, and brings the gear train 38 for an eighth gear position into a power transmittable state when hydraulic pressure is supplied to the hydraulic chamber S8 for an eighth gear, and switches the gear trains 36 and 38 for gear positions, FIG. 4 is a schematic diagram of a hydraulic pressure control circuit of the transmission switching mechanism. As illustrated in FIG. 4, the hydraulic pressure control device 70 includes a hydraulic pressure control circuit 71 for selectively supplying hydraulic pressure from an oil pump 72 to the hydraulic chambers S1 to S8 of the pressure actuators 61 to 64 to bring the gear trains 31 to 38 for predetermined gear positions into a power transmittable state.

In the hydraulic pressure control circuit 71, hydraulic pressure of hydraulic oil generated by the oil pump 72 as a pressure source is adjusted to a predetermined line pressure via a predetermined hydraulic circuit 74 and is output to each pressure actuator side. The hydraulic pressure control circuit 71 includes a plurality of switching valves that switch an oil passage connected to a hydraulic chamber to which hydraulic pressure for making a plurality of gear trains for gear positions in a power transmittable state is supplied, and hydraulic pressure is supplied to a hydraulic chamber of at least one gear train for a gear position through at least two switching valves. The transmission 10 includes three switching valves 81 to 83 for switching an oil passage connected to the hydraulic chambers S1 to S8 to which hydraulic pressure for making eight of the gear trains 31 to 38 for gear positions in a power transmittable state is supplied, and hydraulic pressure is supplied to the hydraulic chambers S1 to 38 of eight of the gear trains 31 to 38 for gear positions through two of the switching valves 81 to 83.

The first switching valve 81 is connected to the predetermined hydraulic circuit 74. The first switching valve 81 includes a valve body 81a, a spool 81b movably disposed in the valve body 81a, and a return spring 81c that is disposed on one end side of the spool 81b and applies a biasing force to the spool 81b. The first switching valve 81 includes a control port 1a, an input port 1b, a first output port 1c, a second output port 1d, a first drain port 1e, and a second drain port 1f.

The hydraulic pressure control circuit 71 includes a first control valve 84 that controls operation of the first switching valve 81, a second control valve 85 that controls operation of the second switching valve 82, and a third control valve 86 that controls operation of the third switching valve 83. As each of the control valves 84 to 86, an on-off solenoid valve formed in a similar manner is used. Operation of each of the control valves 84 to 86 is controlled by a controller 73. The controller 73 is configured by a computer having an arithmetic processing device, a storage device, and the like.

The first control valve 84 includes a supply port 4a to which hydraulic pressure is supplied, a control port 4b that supplies hydraulic pressure to the control port 1a of the first switching valve 81 to control movement of the spool 81b, and a discharge port 4c for discharging hydraulic pressure. The first control valve 84 is formed to cause the supply port da to communicate with the control port 4b when energized, and to cause the control port 4b to communicate with the discharge port 4c when de-energized. In the first control valve 84, supply of hydraulic pressure to the control port 1a of the first switching valve 81 is controlled by the controller 73.

In the first switching valve 81, when the first control valve 84 is energized, hydraulic pressure is supplied to the control port 1a and the spool 81b is disposed on one end side, so that the input port 1b and the first output port 1c communicate with each other and the second output port 1d and the second drain port 1f communicate with each other. In the first switching valve 81, when the first control valve 84 is de-energized, no hydraulic pressure is supplied to the control port 1a and the spool 81b is disposed on the other end side, so that the input port 1b and the second output port 1d communicate with each other and the first output port 1c and the first drain port 1e communicate with each other. The first switching valve 81 includes one switching unit 80a that switches communication between an input port and an output port.

The second switching valve 82 is connected to the predetermined hydraulic circuit 74. The second switching valve 82 includes a valve body 82a, a spool 82b movably disposed in the valve body 82a, and a return spring 82c that is disposed on one end side of the spool 82b and applies a biasing force to the spool 82b. The second switching valve 82 includes a control port 2a, a first input port 2b, a second input port 2c, a first output port 2d, a second output port 2e, a third output port 2f, a fourth output port 2g, a first drain port 2h, a second drain port 2j, a third drain port 2k, and a fail-safe port 2m.

The second control valve 85 includes a supply port 5a to which hydraulic pressure is supplied, a control port 5b that supplies hydraulic pressure to the control port 2a of the second switching valve 82 to control movement of the spool 82b, and a discharge port 5c for discharging hydraulic pressure. The second control valve 85 is formed to cause the supply port 5a to communicate with the control port 5b when energized, and to cause the control port 5b to communicate with the discharge port 5c when de-energized. In the second control valve 85, supply of hydraulic pressure to the control port 2a of the second switching valve 82 is controlled by the controller 73.

In the second switching valve 82, when the second control valve 85 is energized, hydraulic pressure is supplied to the control port 2a and the spool 82b is disposed on one end side, so that the first input port 2b and the first output port 2d communicate with each other, the second input port 2c and the third output port 2f communicate with each other, and the fourth output port 2g and the third drain port 2k communicate with each other. In the second switching valve 82, when the second control valve 85 is de-energized, hydraulic pressure is not supplied to the control port 2a and the spool 82b is disposed on the other end side, so that the first input port 2b and the second output port 2e communicate with each other, the second input port 2c and the fourth output port 2g communicate with each other, the first output port 2d and the first drain port 2h communicate with each other, and the third output port 2f and the second drain port 2j communicate with each other. The second switching valve 82 includes two switching units 80b and 80c that switch communication between an input port and an output port.

The fail-safe port 2m is configured to be supplied with hydraulic pressure supplied to a hydraulic chamber of a gear train for a predetermined gear position at the time of energization so as to bias a spool in a direction of moving to one end side at the time of de-energization. The fail-safe port 2m is connected to the third output port 2f by an oil passage, and as will be described later, when the second switching valve 82 is energized, specifically, when the second control valve 85 is energized, hydraulic pressure supplied to the hydraulic chamber S7 of the gear train 37 for a seventh gear position is supplied. The spool 82b of the second switching valve 82 has an enlarged diameter portion 82f in which a land portion 82d disposed on one end side of the spool 82b is formed to be larger than another land portion 82e in a radial direction, and can be held on one end side of the spool 82b when hydraulic pressure supplied to the hydraulic chamber S7 of the gear train 37 for a seventh gear position is supplied at the time of energization of the second switching valve 82.

The third switching valve 83 includes a valve body 83a, a spool 83b movably disposed in the valve body 83a, and a return spring 83c that is disposed on one end side of the spool 83b and applies a biasing force to the spool 83b. The third switching valve 83 includes a control port 3a, a first input port 3b, a second input port 3c, a third input port 3d, a first output port 3e, a second output port 3f, a third output port 3g, a fourth output port 3h, a fifth output port 3j, a sixth output port 3k, a first drain port 3m, a second drain port 3n, a third drain port 3p, and a fourth drain port 3q. Three of the switching valves 81 to 83 have the spools 81b, 82b, and 83b having different lengths. The switching valves 81 to 83 and the control valves 84 to 86 are assembled to a transmission case.

The third control valve 86 includes a supply port 6a to which hydraulic pressure is supplied, a control port 6b that supplies hydraulic pressure to the control port 3a of the third switching valve 83 to control movement of the spool 83b, and a discharge port 6c for discharging hydraulic pressure. The third control valve 86 is formed to cause the supply port 6a to communicate with the control port. 6b when energized, and to cause the control port 6b to communicate with the discharge port 5c when de-energized. In the third control valve 86, supply of hydraulic pressure to the control port 3a of the third switching valve 83 is controlled by the controller 73.

In the third switching valve 83, when the third control valve 86 is energized, hydraulic pressure is supplied to the control port 3a and the spool 83b is disposed on one end side, so that the first input port 3b and the first output port 3e communicate with each other, the second input port 3c and the third output port 3g communicate with each other, the third input port 3d and the fifth output port 3j communicate with each other, the second output port 3f and the second drain port 3n communicate with each other, the fourth output port 3h and the third drain port 3p communicate with each other, and the sixth output port 3k and the fourth drain port 3q communicate with each other. In the third switching valve 83, when the third control valve 86 is de-energized, hydraulic pressure is not supplied to the control port 3a and the spool 83b is disposed on the other end side, so that the first input port 3b and the second output port 3f communicate with each other, the second input port 3c and the fourth output port 3h communicate with each other, the third input port 3d and the sixth output port. 3k communicate with each other, the first output port 3e and the first drain port 3m communicate with each other, the third output port 3g and the second drain port 3n communicate with each other, and the fifth output port 3j and the third drain port 3p communicate with each other. The third switching valve 83 includes three switching units 80d, 80e, and 80f that switch communication between an input port and an output port.

In the hydraulic pressure control circuit 71, an oil passage for supplying hydraulic pressure that is a line pressure from the predetermined hydraulic circuit 74 includes an oil passage 71a connected to the input port 1b of the first switching valve 81, an oil passage 71b connected to the first input port 2b of the second switching valve 82, and oil passages 71c, 71d, and 71e connected to the supply ports 4a, 5a, and 6a of the first control valve 84, the second control valve 85, and the third control valve 86. Hydraulic pressure generated by the oil pump 72 is supplied to the input port 1b of the first switching valve 81, the first input port 2b of the second switching valve 82, and the supply ports 4a, 5a, and 6a of the first control valve 84, the second control valve 85, and the third control valve 86.

The hydraulic pressure control circuit 71 includes an oil passage 71f that connects the first output port 1c of the first switching valve 81 and the third input port 3d of the third switching valve 83, an oil passage 71g that connects the second output port 1d of the first switching valve 81 and the second input port 2c of the second switching valve 82, an oil passage 71h that connects the first output port 2d of the second switching valve 82 and the second input port 3c of the third switching valve 83, and an oil passage 71j that connects the second output port 2e of the second switching valve 82 and the first input port 3b of the third switching valve 83.

The hydraulic pressure control circuit 71 includes an oil passage 71k that connects the hydraulic chamber S1 for a first gear and the fifth output port 3j of the third switching valve 83, an oil passage 71m that connects the hydraulic chamber S2 for a second gear and the first output port 3e of the third switching valve 83, an oil passage 71n that connects the hydraulic chamber S3 for a third gear and the fourth output port 2g of the second switching valve 82, an oil passage 71p that connects the hydraulic chamber S4 for a fourth gear and the second output port 3f of the third switching valve 83, an oil passage 71q that connects the hydraulic chamber 85 for a fifth gear and the sixth output port 3k of the third switching valve 83, and an oil passage 71r that connects the hydraulic chamber 86 for a sixth gear and the fourth output port 3h of the third switching valve 83, an oil passage 71s that connects the hydraulic chamber S7 for a seventh gear and the third output port 2f of the second switching valve 82, and an oil passage 71t that connects the hydraulic chamber 88 for an eighth gear and the third output port 3g of the third switching valve 83.

An oil passage L1 to the hydraulic chamber 1 for a first gear includes the oil passages 71a, 71f, and 71k, an oil passage L2 to the hydraulic chamber 82 for a second gear includes the oil passages 71b, 71j, and 71m, an oil passage L3 to the hydraulic chamber 83 for a third gear includes the oil passages 71a, 71g, and 71n, an oil passage L4 to the hydraulic chamber S4 for a fourth gear includes the oil passages 71b, 71j, and 71p, an oil passage L5 to the hydraulic chamber S5 for a fifth gear includes the oil passages 71a, 71f, and 71q, an oil passage L6 to the hydraulic chamber S6 for a sixth gear includes the oil passages 71b, 71h, and 71r, an oil passage L7 to the hydraulic chamber S7 for a seventh gear includes the oil passages 71a, 71g, and 71s, and an oil passage L8 to the hydraulic chamber S8 for an eighth gear includes the oil passages 71b, 71h, and 71t. One of the oil passages L1 to L8 is connected to each of eight of the hydraulic chambers S1 to S8, and hydraulic pressure is supplied through two of the switching valves 81 to 83. Hydraulic pressure may be supplied to at least one of eight of the hydraulic chambers S1 to S8 through at least two switching valves.

Although not illustrated, the hydraulic pressure control circuit 71 includes an oil passage connected from the predetermined hydraulic circuit 74 to each of a hydraulic chamber of the first clutch 13a and a hydraulic chamber of the second clutch 13b. The controller 73 controls supply of hydraulic pressure to hydraulic chambers of the first clutch 13a and the second clutch 13b to control engagement and disengagement of first clutch 13a and second clutch 13b.

FIG. 5 is an explanatory diagram illustrating a hydraulic pressure supply pattern. The controller 73 controls a plurality of switching valves to selectively switch a plurality of hydraulic pressure supply patterns for supplying hydraulic pressure to a hydraulic chamber of a gear train for a gear position. As illustrated in FIG. 5, in the transmission 10, three of the switching valves 81 to 83 are controlled by the three of the control valves 84 to 86 so as to selectively switch seven hydraulic pressure supply patterns for supplying hydraulic pressure to eight of the hydraulic chambers S1 to S8. In FIG. 5, for a first pattern to a seventh pattern, a gear position in a power transmittable state is shown as a gear position mode, and the first to third control valves 84 to 86 corresponding to the first to third switching valves 81 to 83 are shown as ON when energized and OFF when de-energized.

As illustrated in FIG. 5, in the first pattern, the first control valve 84 is controlled to be ON, the second control valve 85 is controlled to be OFF, and the third control valve 86 is controlled to be ON. Hydraulic pressure is supplied to the hydraulic chamber S1 for a first gear and the hydraulic chamber S2 for a second gear, and the gear train 31 for a first gear position and the gear train 32 for a second gear position are brought into a power transmittable state.

Figure 6:
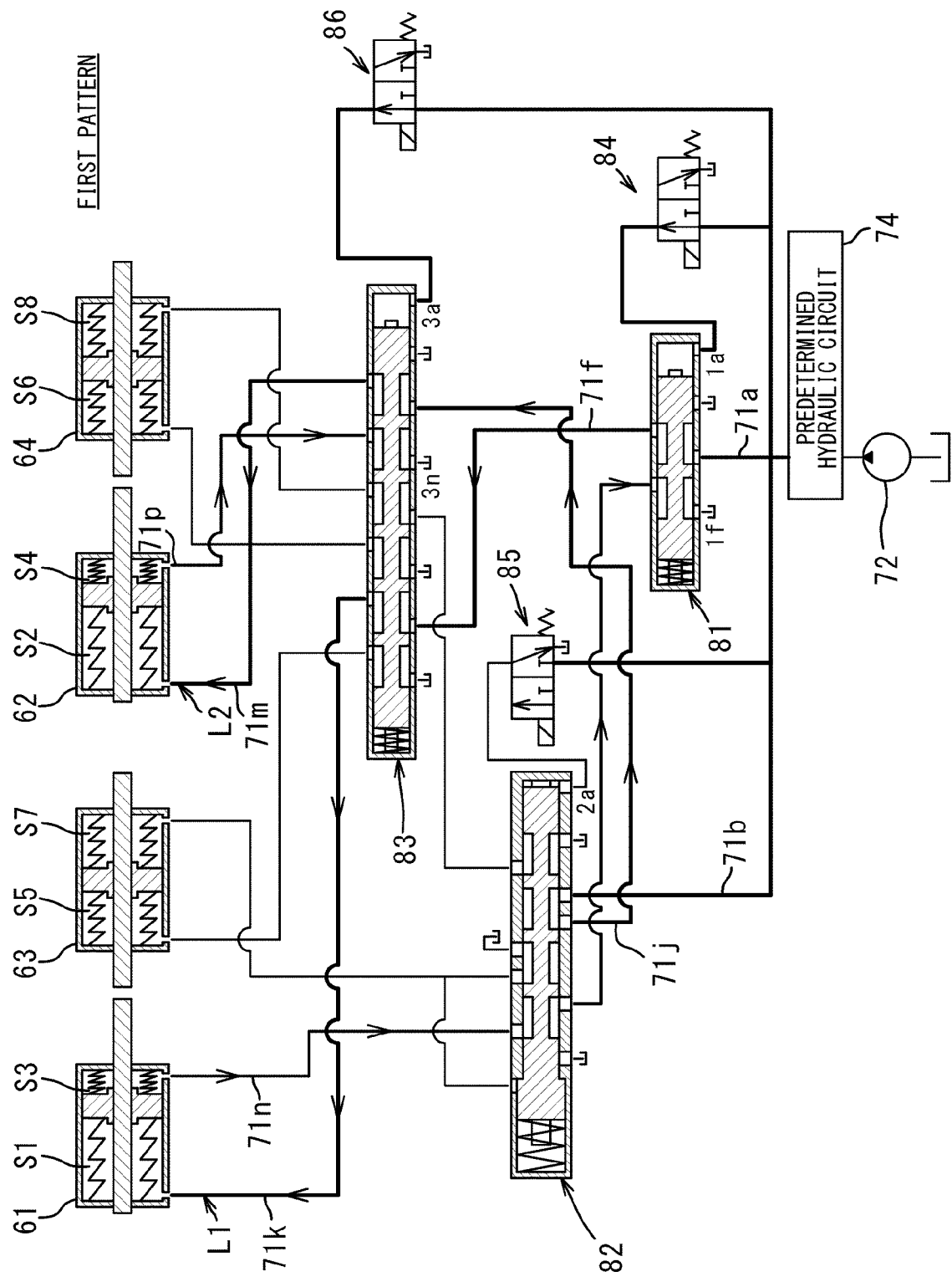
FIG. 6 is a diagram illustrating the hydraulic pressure control circuit of a first pattern.

FIG. 6 is a diagram illustrating a hydraulic pressure control circuit of the first pattern. As illustrated in FIG. 6, in the first pattern, hydraulic pressure generated by the oil pump 72 is supplied to the hydraulic chamber S1 for a first gear through the oil passage L1 and is supplied to the hydraulic chamber 32 for a second gear through the oil passage L2. The oil passage 71n connected to the hydraulic chamber S3 for a third gear communicates with the second drain port 1f of the first switching valve 81 so that hydraulic pressure is discharged, and the oil passage 71p connected to the hydraulic chamber SA for a fourth gear communicates with the second drain port 3n of the third switching valve 83 so that hydraulic pressure is discharged. Hydraulic pressure is also discharged for the hydraulic chamber S5 for a fifth gear to the hydraulic chamber S8 for an eighth gear. When the first clutch 13a is engaged and the second clutch 13b is released in a state where the first pattern is selected, speed of power from the drive source 6 is changed in a first gear position in the transmission 10 and is output from the output shaft 12. When the first clutch 13a is released and the second clutch 13b is engaged in a state where the first pattern is selected, speed of power from the drive source 6 is changed in a second gear position in the transmission 10 and output from the output shaft 12.

As illustrated in FIG. 5, in the second pattern, the first control valve 84 is controlled to be OFF, the second control valve 85 is controlled to be OFF, and the third control valve 86 is controlled to be ON. Hydraulic pressure is supplied to the hydraulic chamber S2 for a second gear and the hydraulic chamber S3 for a third gear, and the gear train 32 for a second gear position and the gear train 33 for a third gear position are brought into a power transmittable state.

Figure 7:
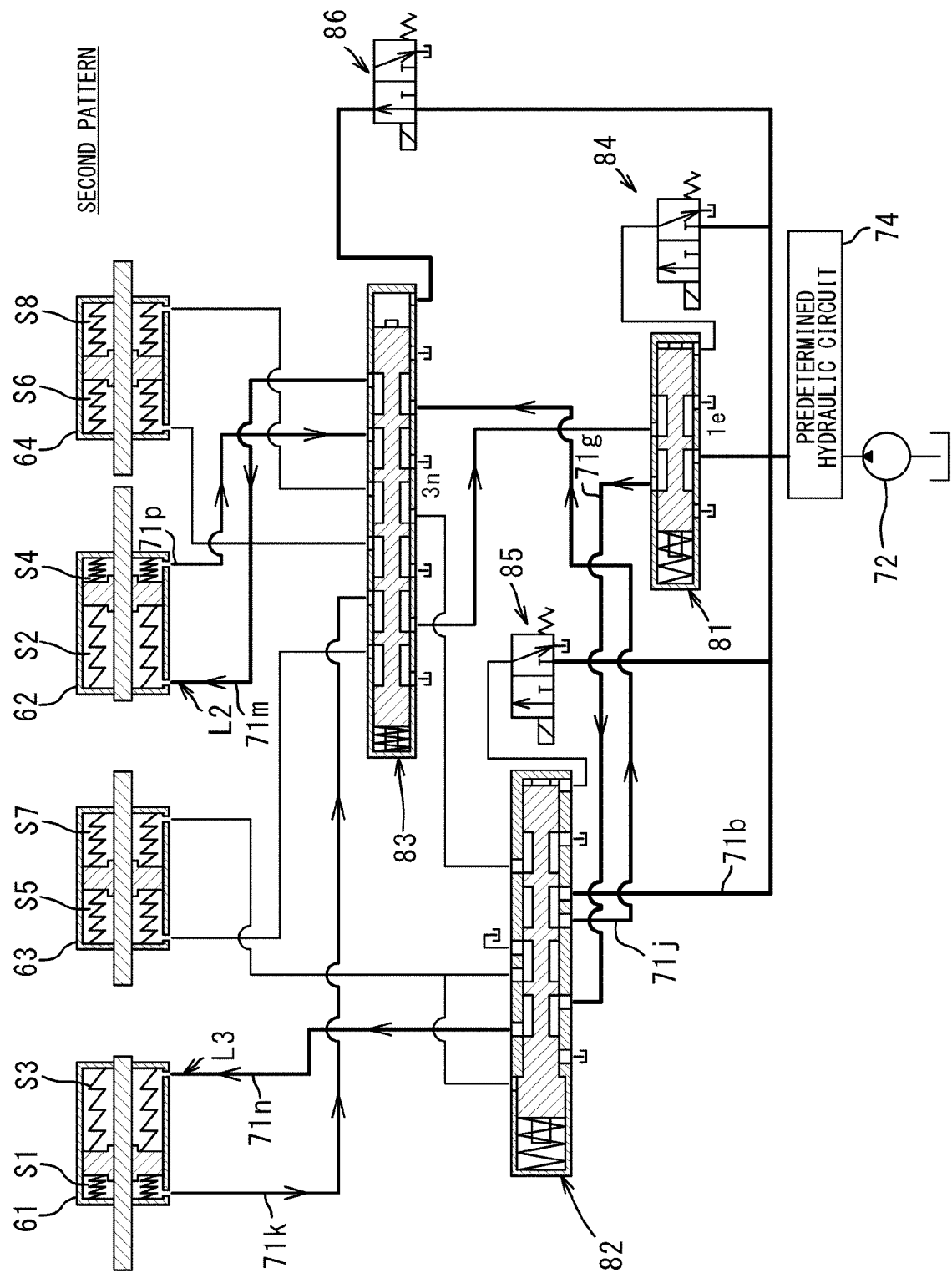
FIG. 7 is a diagram illustrating the hydraulic pressure control circuit of a second pattern.

FIG. 7 is a diagram illustrating a hydraulic pressure control circuit of a second pattern. As illustrated in FIG. 7, in the second pattern, hydraulic pressure generated by the oil pump 72 is supplied to the hydraulic chamber S2 for a second gear through the oil passage L2 and is supplied to the hydraulic chamber S3 for a third gear through the oil passage L3. The oil passage 71k connected to the hydraulic chamber S1 for a first gear communicates with the first drain port 1e of the first switching valve 81 so that hydraulic pressure is discharged, and the oil passage 71p connected to the hydraulic chamber SA for a fourth gear communicates with the second drain port 3n of the third switching valve 83 so that hydraulic pressure is discharged. Hydraulic pressure is also discharged for the hydraulic chamber S1 for a fifth gear to the hydraulic chamber S8 for an eighth gear.

When the first clutch 13a is released and the second clutch 13b is engaged in a state where the second pattern is selected, speed of power from the drive source 6 is changed in a second gear position in the transmission 10 and output from the output shaft 12. When the first clutch 13a is engaged and the second clutch 13b is released in a state where the second pattern is selected, speed of power from the drive source 6 is changed in a third gear position in the transmission 10 and is output from the output shaft 12.

As illustrated in FIG. 5, in the third pattern, the first control valve 84 is controlled to be OFF, the second control valve 85 is controlled to be OFF, and the third control valve 86 is controlled to be OFF. Hydraulic pressure is supplied to the hydraulic chamber S3 for a third gear and the hydraulic chamber S4 for a fourth gear, and the gear train 33 for a third gear position and the gear train 34 for a fourth gear position are brought into a power transmittable state.

Figure 8:
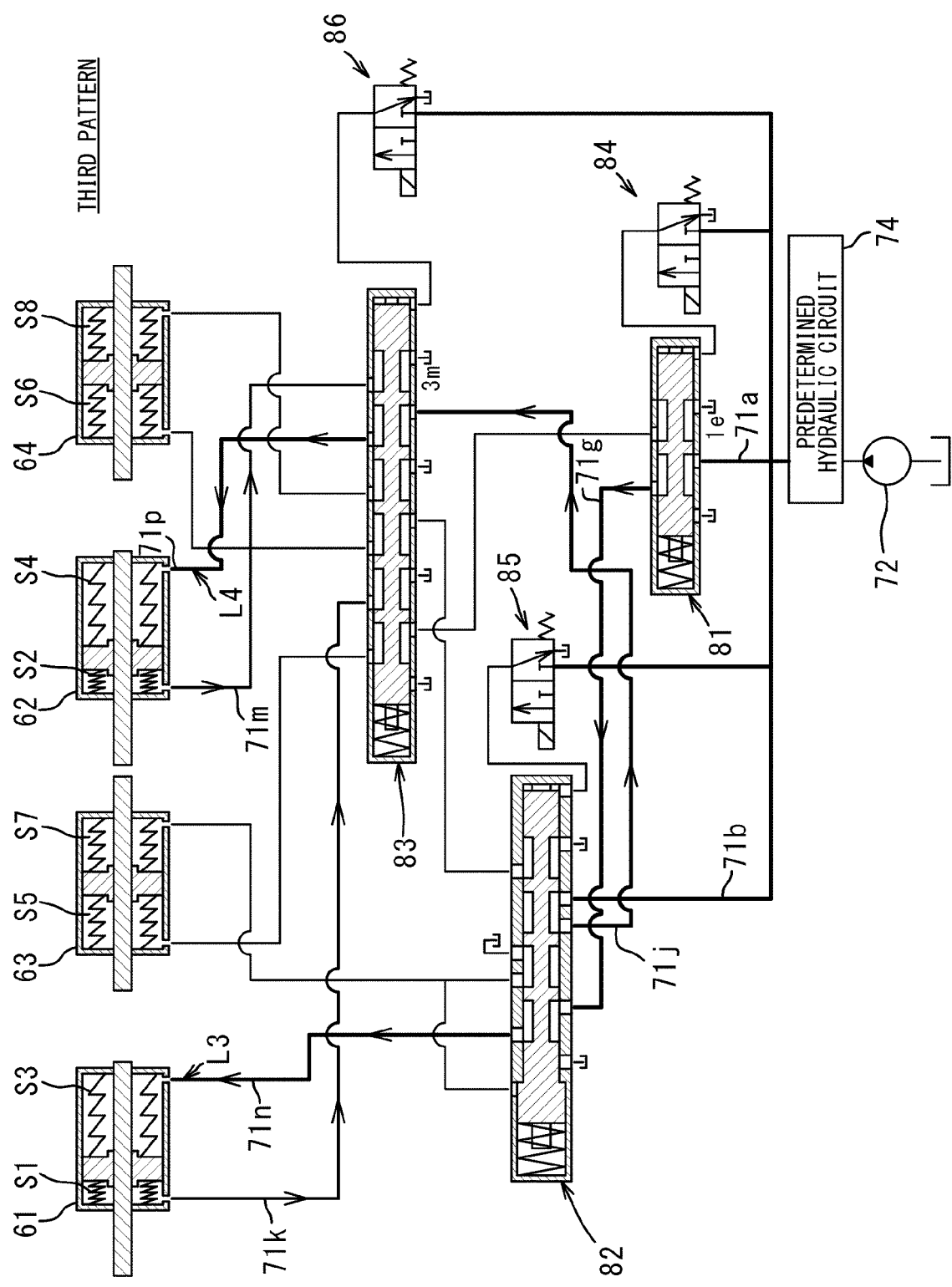
FIG. 8 is a diagram illustrating the hydraulic pressure control circuit of a third pattern.

FIG. 8 is a diagram illustrating a hydraulic pressure control circuit of the third pattern. As illustrated in FIG. 8, in the third pattern, hydraulic pressure generated by the oil pump 72 is supplied to the hydraulic chamber S3 for a third gear through the oil passage L3, and is supplied to the hydraulic chamber SA for a fourth gear through the oil passage LA. The oil passage 71k connected to the hydraulic chamber S1 for a first gear communicates with the first drain port 1e of the first switching valve 81 so that hydraulic pressure is discharged, and the oil passage 71m connected to the hydraulic chamber S2 for a second gear communicates with the first drain port 3m of the third switching valve 83 so that hydraulic pressure is discharged. Hydraulic pressure is also discharged for the hydraulic chamber S1 for a fifth gear to the hydraulic chamber S8 for an eighth gear.

When the first clutch 13a is engaged and the second clutch 13b is released in a state where the third pattern is selected, speed of power from the drive source 6 is changed in a third gear position in the transmission 10 and is output from the output shaft 12. When the first clutch 13a is released and the second clutch 13b is engaged in a state where the third pattern is selected, speed of power from the drive source 6 is changed in a fourth gear position in the transmission 10 and output from the output shaft 12.

As illustrated in FIG. 5, in the fourth pattern, the first control valve 84 is controlled to be ON, the second control valve 85 is controlled to be OFF, and the third control valve 86 is controlled to be OFF, hydraulic pressure is supplied to the hydraulic chamber S4 for a fourth gear and the hydraulic chamber S5 for a fifth gear, and the gear train 34 for a fourth gear position and the gear train 35 for a fifth gear position are brought into a power transmittable state. When the first clutch 13a is released and the second clutch 13b is engaged, speed of power from the drive source 6 is changed in a fourth gear position and output from the output shaft 12. When the first clutch 13a is engaged and the second clutch 13b is released, speed of power from the drive source 6 is changed in a fifth gear position and output from the output shaft 12.

In the fifth pattern, the first control valve 84 is controlled to be ON, the second control valve 85 is controlled to be ON, and the third control valve 86 is controlled to be OFF, hydraulic pressure is supplied to the hydraulic chamber S5 for a fifth gear and the hydraulic chamber 36 for a sixth gear, and the gear train 35 for a fifth gear position and the gear train 36 for a sixth gear position are brought into a power transmittable state. When the first clutch 13a is engaged and the second clutch 13b is released, speed of power from the drive source 6 is changed in a fifth gear position and output from the output shaft 12. When the first clutch 13a is released and the second clutch 13b is engaged, speed of power from the drive source 6 is changed in a sixth gear position and output from the output shaft 12.

Figure 9:
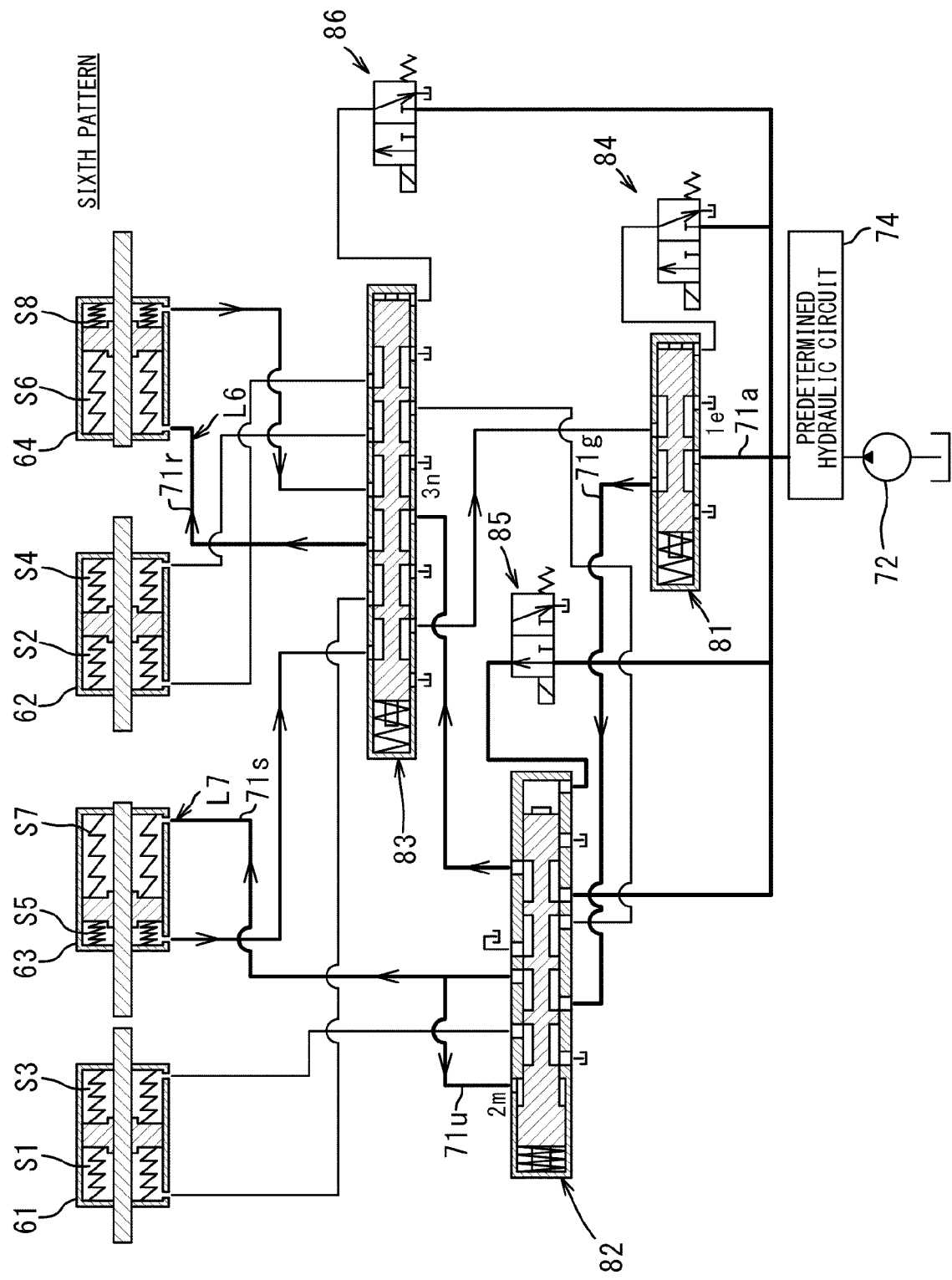
FIG. 9 is a diagram illustrating the hydraulic pressure control circuit of a sixth pattern.

FIG. 9 is a diagram illustrating a hydraulic pressure control circuit of the sixth pattern. As illustrated in FIG. 5, in the sixth pattern, the first control valve 84 is controlled to be OFF, the second control valve 85 is controlled to be ON, and the third control valve 86 is controlled to be OFF. As illustrated in FIG. 9, hydraulic pressure is supplied to the hydraulic chamber 86 for a sixth gear and the hydraulic chamber S7 for a seventh gear, and the gear train 36 for a sixth gear position and the gear train 37 for a seventh gear position are brought into a power transmittable state. When the first clutch 13a is released and the second clutch 13b is engaged, speed of power from the drive source 6 is changed in a sixth gear position and output from the output shaft 12. When the first clutch 13a is engaged and the second clutch 13b is engaged, speed of power from the drive source 6 is changed in a seventh gear position and output from the output shaft 12.

As illustrated in FIG. 5, in the seventh pattern, the first control valve 84 is controlled to be OFF, the second control valve 85 is controlled to be ON, and the third control valve 86 is controlled to be ON, hydraulic pressure is supplied to the hydraulic chamber S7 for a seventh gear and the hydraulic chamber S8 for an eighth gear, and the gear train 37 for a seventh gear position and the gear train 38 for an eighth gear position are brought into a power transmittable state. When the first clutch 13a is engaged and the second clutch 13b is released, speed of power from the drive source 6 is changed in a seventh gear position and output from the output shaft 12. When the first clutch 13a is released and the second clutch 13b is engaged, speed of power from the drive source 6 is changed in an eighth gear position and output from the output shaft 12.

The controller 73 controls three of the switching valves 81 to 83 to selectively switch seven hydraulic pressure supply patterns for supplying hydraulic pressure to the hydraulic chambers S1 to S8 of the gear trains 31 to 38 for gear positions. The controller 73 controls three of the switching valves 81 to 83 by the control valve 84 to 86 so as to selectively switch seven hydraulic pressure supply patterns for supplying hydraulic pressure to a hydraulic chamber of one of the first gear trains 30a for gear positions that is an odd-numbered position and one of the second gear trains 30b for gear positions that is an even-numbered position.

Figure 10:
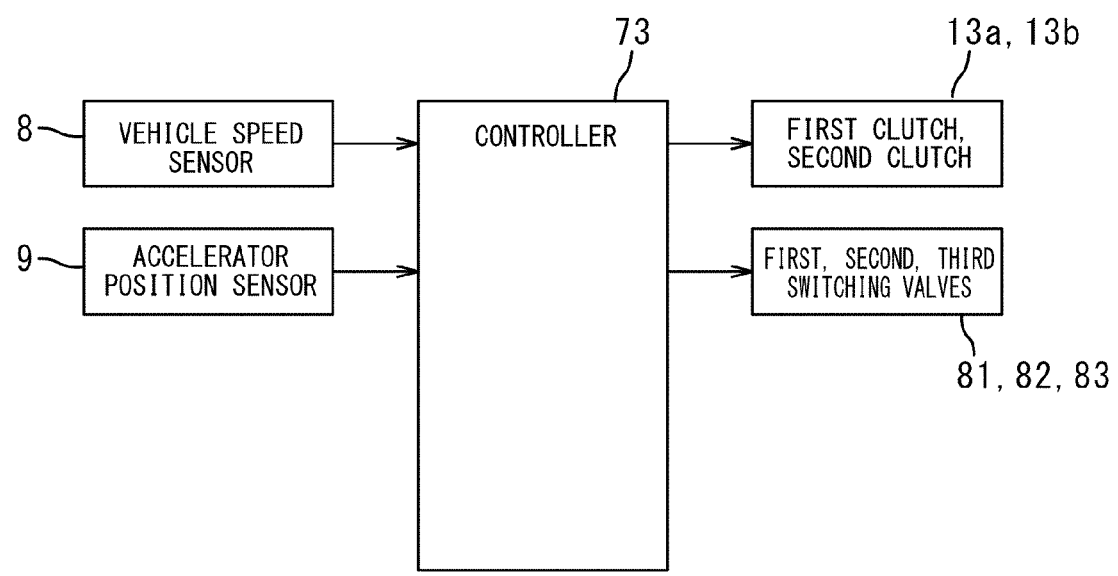
FIG. 10 is a block diagram illustrating control of the hydraulic pressure control circuit.

FIG. 10 is a block diagram illustrating control of the hydraulic pressure control circuit. As illustrated in FIG. 10, the utility vehicle 1 includes a vehicle speed sensor 8 that detects a vehicle speed, and an accelerator position sensor 9 that detects a depression amount (accelerator position) of an accelerator pedal. A signal from the vehicle speed sensor 8 and the accelerator position sensor 9 and the like are input to the controller 73.

The controller 73 stores a gear position map indicating a relationship between a vehicle speed and an accelerator position of the utility vehicle 1 and a gear position. In the gear position map, a gear position switching line is set, and a hydraulic pressure supply pattern switching line for upshift and downshift is set. The controller 73 automatically switches a hydraulic pressure supply pattern and automatically selects a gear position based on the gear position map in accordance with a traveling state of the utility vehicle 1. The controller 73 controls hydraulic pressure supplied to a hydraulic chamber of the first and second clutches 13a and 13b to control the first and second clutches 13a and 13b, and controls the first, second, and third switching valves 81, 82, and 83 so as to control the first, second, and third control valves 84, 85, and 86 to control hydraulic pressure supplied to the hydraulic chambers S1 to S8 for first to eighth gears.

In the transmission 10, when the sixth pattern is selected, the first control valve 84 is controlled to be OFF, the second control valve 85 is controlled to be ON, and the third control valve 86 is controlled to be OFF. As illustrated in FIG. 9, hydraulic pressure is supplied to the hydraulic chamber SE for a sixth gear and the hydraulic chamber 37 for a seventh gear, and a sixth gear position or a seventh gear position is set according to a traveling State, specifically, a vehicle speed and an accelerator position. At this time, when the second control valve 85 fails and becomes in a de-energized state, the spool 82b may move to the other side and a power transmission state of a gear train for a gear position may be switched.

In the transmission 10, the second switching valve 82, which is a downstream side switching valve disposed on the most downstream side of the oil passage L7 connected to the hydraulic chamber S7 of the gear train 37 for a seventh gear position when the sixth pattern is selected, is configured to maintain a state at the time of energization in which the spool 82b is moved to one end side when de-energized.

The second switching valve 82 includes a fail-safe port 2m to which hydraulic pressure supplied to the hydraulic chamber S7 of the gear train 37 for a seventh gear position when the second control valve 85 is energized is supplied so that the spool 82b is biased in a direction of moving to one end side when the second control valve 85 is de-energized. An oil passage 71u branched from the oil passage 71s connected to the hydraulic chamber S7 for a seventh gear is connected to the fail-safe port 2m, and hydraulic pressure supplied to the hydraulic chamber S7 for a seventh gear is supplied to the fail-safe port 2m.

In the second switching valve 82, when the sixth pattern is selected, the second control valve 84 is controlled to be ON, and the spool 82b is moved to one end side. Hydraulic pressure supplied to the hydraulic chamber S7 for a seventh gear is also supplied to the fail-safe port 2m and the spool 82b is pressed toward one end side. By the above, even if the second control valve 85 fails and becomes in a de-energized state, it is possible to prevent that, as illustrated in FIG. 8, the spool 82b moves to the other end side and switching is made to the third pattern, which is not a hydraulic pressure supply pattern adjacent to the sixth pattern, to switch a power transmission state of a gear train fox a gear position.

In the transmission 10, the first pattern to the seventh pattern are set such that, except for the sixth pattern, even if one of the control valves 84 to 86 fails, switching is made to an adjacent hydraulic pressure supply pattern and a power transmission state of a gear train for a gear position is switched.

In the transmission 10 according to the present embodiment, the input shaft 11 has the first input shaft 11a and the second input shaft 11b, the output shaft 12 is disposed parallel to the first input shaft 11a and the second input shaft 11b, the clutch 13 has the first clutch 13a and the second clutch 13b that connect and disconnect power from the drive source 6 input to the first input shaft 11a and the second input shaft 11b, respectively, a plurality of the gear trains 31 to 38 for gear positions have a plurality of the first gear trains 31, 33, 35, and 37 for gear positions and the second gear trains 32, 34, 36, and 38 for gear positions provided between the first input shaft 11a and the output shaft 12 and between the second input shaft 11b and the output shaft 12, respectively, and the controller 73 controls a plurality of the switching valves 81 to 83 so as to selectively switch a plurality of hydraulic pressure supply patterns for supplying hydraulic pressure to a hydraulic chamber of at least one of one of the first gear trains for gear positions and one of the second gear trains for gear positions.

By the above, in the transmission 10 that is a DCT including the first and second clutches 13a and 13b, and a plurality of the gear trains 31 to 38 for gear positions including a plurality of the first gear trains 31, 33, 35, and 37 for gear positions and a plurality of the second gear trains 32, 34, 36, and 38 for gear positions respectively provided between the first input shaft 11a and the output shaft 12 and between the second input shaft 11b and the output shaft 12, it is possible to reduce cost as compared with a case where an electric actuator such as a motor is used by bringing the gear trains 31 to 38 for gear positions into a power transmission state by using hydraulic pressure, and it is possible to reduce cost by reducing the number of the switching valves 81 to 83 as compared with a case where a switching valve is provided for each hydraulic chamber of a gear train for a gear position.

Figure 11:
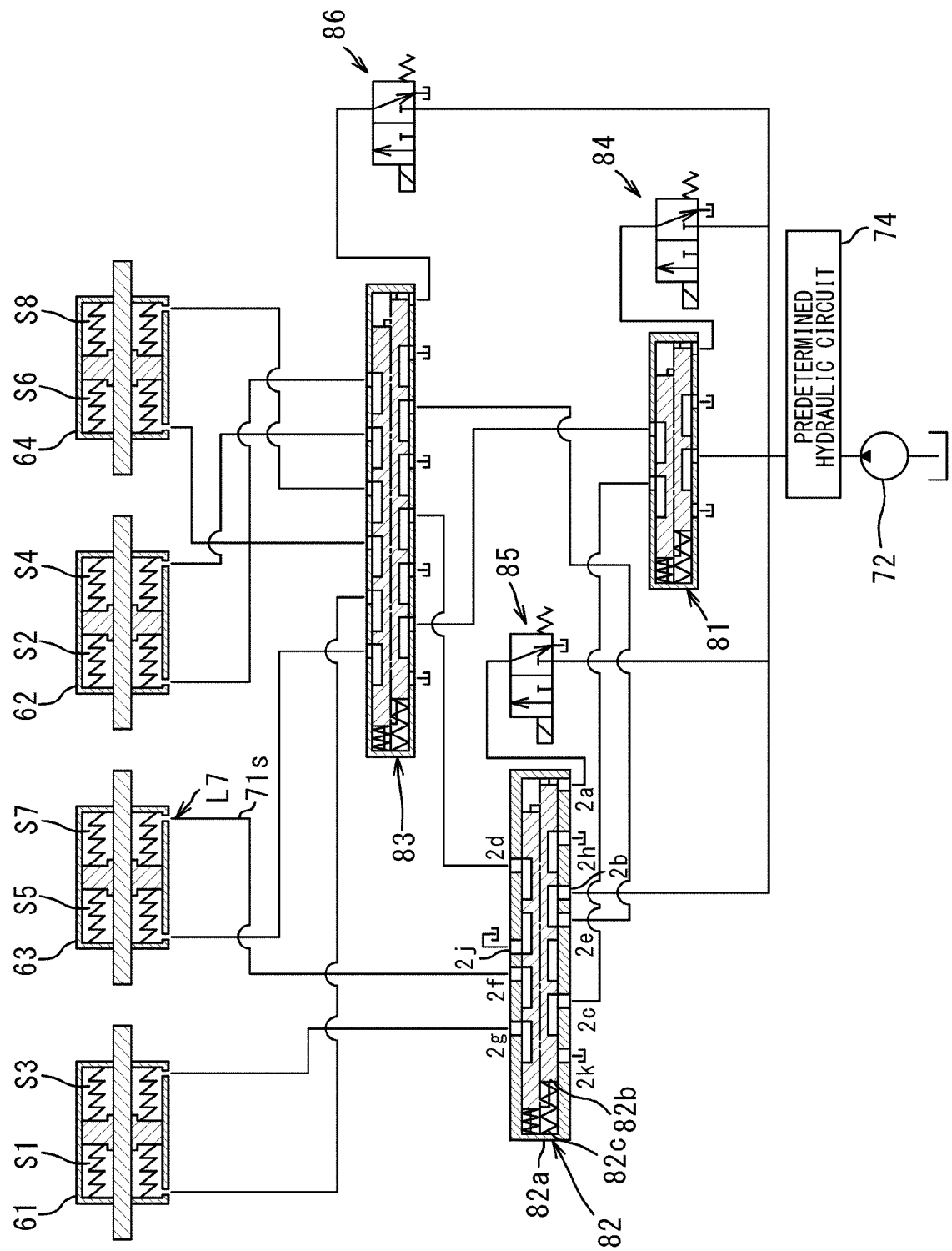
FIG. 11 is a schematic diagram of a variation of the hydraulic pressure control circuit of the transmission switching mechanism.
Figure 12:
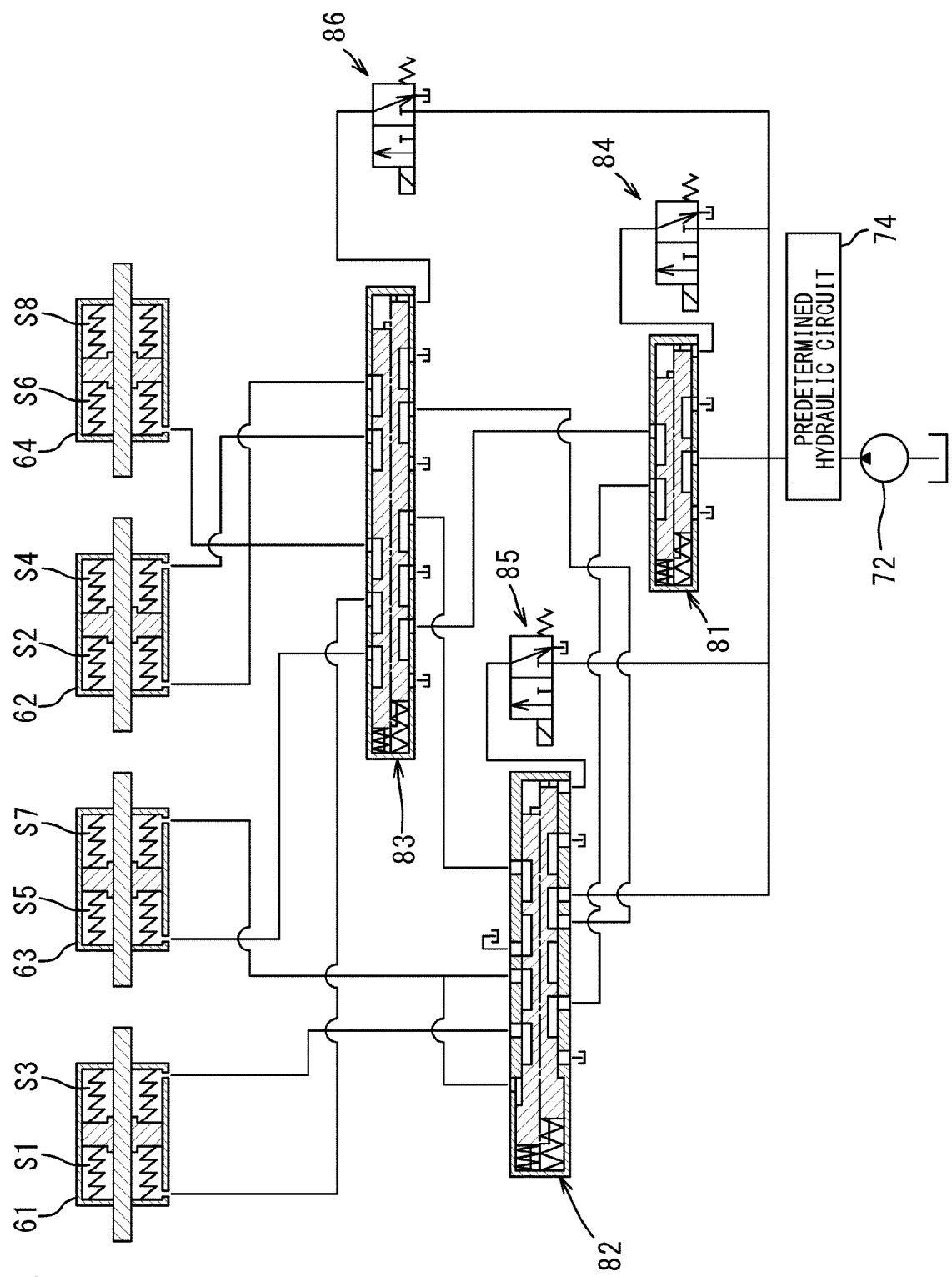
FIG. 12 is a schematic diagram of another variation of the hydraulic pressure control circuit of the transmission switching mechanism.

FIG. 11 is a schematic diagram of a variation of the hydraulic pressure control circuit of the transmission switching mechanism. As illustrated in FIG. 11, in the hydraulic pressure control circuit 71, the fail-safe port 2m does not need to be provided in the second switching valve 82. In this case, the spool 82b of the second switching valve 82 is not provided with the enlarged diameter portion 82f, and is not provided with the oil passage 71u that connects the hydraulic chamber S7 for a seventh gear and the fail-safe port, FIG. 12 is a schematic diagram of another variation of the hydraulic pressure control circuit of the transmission switching mechanism. As illustrated in FIG. 12, the configuration can be such that, in the hydraulic pressure control circuit 71, the oil passage 71t connected to the hydraulic chamber S8 for an eighth gear and the third output port 3g of the third switching valve 83 is not provided, and the first pattern to the sixth pattern are selected in the hydraulic pressure supply pattern, so that the gear trains 31 to 37 for first to seventh gear positions are brought into a power transmittable state to switch a gear position. In this case, the gear train 38 for an eighth gear position is not provided in FIG. 2, and the fourth dog ring 44a is not provided with clutch teeth protruding toward a driving gear for an eighth gear.

In the present embodiment, the transmission 10 is described as the dual clutch transmission 10 in which the clutch 13 for connecting and disconnecting power from the drive source 6 is provided on each of two of the input shafts 11, and a plurality of the gear trains 31 to 38 for gear positions provided between the input shaft 11 and the output shaft 12 are switched. However, the present invention is also applicable to a transmission in which a clutch for connecting and disconnecting power from a drive source is provided on one input shaft, and a plurality of gear trains for gear positions provided between the input shaft and the output shaft are switched.

In such a case, a transmission includes an input shaft, an output shaft disposed in parallel to the input shaft, a clutch for connecting and disconnecting power from a drive source input to the input shaft, a plurality of gear trains for gear positions provided between the input shaft and the output shaft, a plurality of switching valves for switching an oil passage connected to a hydraulic chamber to which hydraulic pressure for bringing each of a plurality of gear trains for gear positions into a power transmittable state is supplied, and a controller for controlling a plurality of the switching valves. The controller controls a plurality of the switching valves so as to selectively switch a plurality of hydraulic pressure supply patterns for supplying hydraulic pressure to a hydraulic chamber of a gear train for a gear position, and hydraulic pressure is supplied to a hydraulic chamber of at least one gear train for a gear position through at least two of the switching valves.

In the present embodiment, the meshing clutch 40 is formed such that the clutch teeth 41b to 44b and 41c to 44c of the dog rings 41a to 44a and the clutch teeth 31c to 38c of the driving gears 31a to 38a are engaged with each other. However, the meshing clutch 40 may be formed in a manner that clutch teeth are formed in one of a dog ring and a driving gear, an engagement hole is formed in the other of the dog ring and the driving gear, and the clutch teeth and the engagement hole are engaged with each other.

Further, hydraulic pressure of hydraulic oil generated by the pressure source 72 is output to each pressure actuator side via the predetermined hydraulic circuit 74. However, the hydraulic pressure may be output to each pressure actuator side without passing through the predetermined hydraulic circuit 74. The transmission 10 is also applicable to a transmission other than that of the utility vehicle 1.

As described above, the transmission 10 according to the present embodiment includes the input shaft 11, the output shaft 12 disposed in parallel with the input shaft 11, the clutch 13 that connects and disconnects power from the drive source 6 input to the input shaft 11, a plurality of the gear trains 31 to 38 for gear positions provided between the input shaft 11 and the output shaft 12, a plurality of the switching valves 81 to 83 that switch the oil passages L1 to L8 connected to the hydraulic chambers S1 to S8 to which hydraulic pressure that brings a plurality of the gear trains 31 to 38 for gear positions into a power transmittable state is supplied, respectively, and the controller 73 that controls a plurality of the switching valves 81 to 83. The controller 73 controls a plurality of the switching valves 81 to 83 so as to selectively switch a plurality of hydraulic pressure supply patterns for supplying hydraulic pressure to the hydraulic chambers S1 to S8 of the gear trains 31 to 38 for gear positions, and hydraulic pressure is supplied to the hydraulic chambers S1 to S8 of at least one of the gear trains 31 to 38 for gear positions through at least two of the switching valves 81 to 83.

By the above, by bringing the gear trains 31 to 38 for gear positions into a power transmission state by using hydraulic pressure, it is possible to reduce cost as compared with a case of using an electric actuator such as a motor. Further, since hydraulic pressure is supplied to the hydraulic chambers S1 to S5 of at least one of the gear trains 31 to 38 for gear positions through at least two of the switching valves 81 to 03, it is possible to reduce the number of switching valves and reduce cost as compared with a case where a switching valve is provided for each hydraulic chamber of a gear train for a gear position.

Further, the input shaft 11 has the first input shaft 11a and the second input shaft 11b, the output shaft 12 is disposed parallel to the first input shaft 11a and the second input shaft 11b, the clutch 13 has the first clutch 13a and the second clutch 13b that connect and disconnect power from the drive source 6 input to the first input shaft 11a and the second input shaft 11b, respectively, a plurality of the gear trains 31 to 38 for gear positions have a plurality of the first gear trains 31, 33, 35, and 37 for gear positions and the second gear trains 32, 34, 36, and 38 for gear positions provided between the first input shaft 11a and the output shaft 12 and between the second input shaft 11b and the output shaft 12, respectively, and the controller 73 controls a plurality of the switching valves 81 to 83 so as to selectively switch a plurality of hydraulic pressure supply patterns for supplying hydraulic pressure to a hydraulic chamber of at least one of one of the first gear trains 31, 33, 35, and 37 for gear positions and one of the second gear trains 32, 34, 36, and 38 for gear positions.

By the above, in the transmission 10 that is a DCT including the first and second clutches 13a and 13b, and a plurality of the gear trains 31 to 38 for gear positions including a plurality of the first gear trains 31, 33, 35, and 37 for gear positions and a plurality of the second gear trains 32, 34, 36, and 38 for gear positions respectively provided between the first input shaft 11a and the output shaft 12 and between the second input shaft 11b and the output shaft 12, it is possible to reduce cost by bringing the gear trains 31 to 38 for gear positions into a power transmission state by using hydraulic pressure, and it is possible to reduce cost by reducing the number of the switching valves.

Further, one of the oil passages L1 to 18 is connected to each of a plurality of the hydraulic chambers S1 to S8. By the above, by switching the oil passages L1 to L8 respectively connected to a plurality of the hydraulic chambers S1 to S8, it is possible to realize gear changing of the transmission 10 by using hydraulic pressure to bring the gear trains 31 to 38 for gear positions into a power transmission state.

Further, a plurality of gear trains for gear positions are seven or eight of the gear trains 31 to 37 or 31 to 38 for gear positions. By the above, since a plurality of gear trains for gear positions are seven or eight of the gear trains 31 to 37 or 31 to 38 for gear positions, the number of gear positions is large, and various gear changing can be performed.

Further, a plurality of switching valves are three of the switching valves 81 to 83. By the above, in the transmission 10 including seven or eight of the gear trains 31 to 37 or 31 to 38 for gear positions, since hydraulic pressure can be supplied to the hydraulic chambers S1 to S7 or S1 to S8 of seven or eight of the gear trains 31 to 37 or 31 to 38 for gear positions by using three of the switching valves 81 to 83, the number of switching valves can be reduced and cost can be reduced as compared with a case where a switching valve is provided for each hydraulic chamber.

Further, the switching valves 81 to 83 includes at least one of the switching units 80a to 80f that switch communication between an input port and an output port, and a plurality of the switching valves 81 to 83 include six of the switching units 80a to 80e. By the above, by using a plurality of the switching valves 81 to 83 provided with six of the switching units 80a to 80f that switch communication between an input port and an output port, it is possible to supply hydraulic pressure to each of hydraulic chambers of seven or eight gear trains for gear positions to bring a gear train for a gear position into a power transmittable state.

Further, a plurality of the switching valves 81 to 83 have the spools 81b, 82b, and 83b having different lengths. By the above, when each of a plurality of the switching valves 81 to 83 is assembled to a transmission case, it is possible to prevent the switching valve 81 to 83 from being erroneously assembled to another switching valve position.

Further, the downstream side switching valve 82 disposed on the downstream side of the oil passage L7 connected to the hydraulic chamber S7 of the gear train 37 for a predetermined gear position when a predetermined hydraulic pressure supply pattern is selected is configured to maintain a state at the time of energization in which the spool 82b is moved to one end side of the spool 82b at the time of de-energization. By the above, in a case where the downstream side switching valve 82 is set to an energized state and the other switching valves 81 and 83 are set to a de-energized state when a predetermined hydraulic pressure supply pattern is selected, it is possible to prevent switching of a power transmission state of a gear train for a gear position by the spool 82b moving to the other side of the spool 82b due to failure of the downstream side switching valve 82.

Further, the downstream side switching valve 82 includes the fail-safe port 2m to which hydraulic pressure supplied to the hydraulic chamber S7 of the gear train 37 for a predetermined gear position during energization is supplied so as to bias the spool 82b in a direction of moving to one end side of the spool 82b at the time of de-energization. By the above, it is possible to prevent failure of the downstream side switching valve 82 and switching of a power transmission state of a gear train for a gear position.

Further, the meshing clutch 40 that brings the gear trains 31 to 38 for gear positions into a power transmittable state and the shift fork 50 that moves the meshing clutch 40 are provided. When hydraulic pressure is supplied to the hydraulic chambers S1 to S8 of the gear trains 31 to 38 for gear positions, the shift fork 50 moves the meshing clutch 40 to bring the gear trains 31 to 38 for gear positions into a power transmittable state. By the above, since power can be transmitted using the meshing clutch 40, power from the drive source 6 can be efficiently transmitted.

The utility vehicle 1 including the transmission 10 according to the present embodiment includes the input shaft 11, the output shaft 12 disposed in parallel with the input shaft 11, the clutch 13 that connects and disconnects power from the drive source 6 input to the input shaft 11, a plurality of the gear trains 31 to 38 for gear positions provided between the input shaft 11 and the output shaft 12, a plurality of the switching valves 81 to 83 that switch the oil passages L1 to L8 connected to the hydraulic chambers S1 to S8 to which hydraulic pressure that brings a plurality of the gear trains 31 to 38 for gear positions into a power transmittable state is supplied, respectively, and the controller 73 that controls a plurality of the switching valves 81. The controller 73 controls a plurality of the switching valves 81 to 83 so as to selectively switch a plurality of hydraulic pressure supply patterns for supplying hydraulic pressure to the hydraulic chambers S1 to S8 of the gear trains 31 to 38 for gear positions, and hydraulic pressure is supplied to the hydraulic chambers S1 to S8 of at least one of the gear trains 31 to 38 for gear positions through at least two of the switching valves 81 to 83.

By the above, by bringing the gear trains 31 to 38 for gear positions into a power transmission state by using hydraulic pressure, it is possible to reduce cost as compared with a case of using an electric actuator such as a motor. Further, since hydraulic pressure is supplied to the hydraulic chambers S1 to S8 of at least one of the gear trains 31 to 38 for gear positions through at least two of the switching valves 81 to 83, it is possible to reduce the number of switching valves and reduce cost as compared with a case where a switching valve is provided for each hydraulic chamber of a gear train for a gear position.

The present invention is not limited to the illustrated embodiment, and various improvements and design changes can be made without departing from the gist of the present invention.

What is claimed is:

1. A transmission comprising:
an input shaft;
an output shaft disposed in parallel to the input shaft;
a clutch for connecting and disconnecting power from a drive source input to the input shaft;
a plurality of gear trains for gear positions provided between the input shaft and the output shaft, each gear train having a respective hydraulic chamber;
a plurality of switching valves for switching an oil passage connected to the hydraulic chambers to which hydraulic pressure for bringing each of the plurality of gear trains for gear positions into a power transmittable state is supplied;
a pressure source for generating hydraulic pressure; and
a controller for controlling the plurality of switching valves, wherein
the controller controls the plurality of switching valves so as to selectively switch a plurality of hydraulic pressure supply patterns, each hydraulic pressure supply pattern being configured to supply hydraulic pressure to the hydraulic chamber of one of the gear trains for a corresponding one of the gear positions,
hydraulic pressure is supplied to the hydraulic chamber of at least one of the gear trains for gear positions through at least two of the switching valves, and
hydraulic pressure from the pressure source is input to two different switching valves of the plurality of switching valves.

2. The transmission according to claim 1, wherein
the input shaft includes a first input shaft and a second input shaft,
the output shaft is disposed parallel to the first input shaft and the second input shaft,
the clutch includes a first clutch and a second clutch that connect and disconnect power from a drive source input to the first input shaft and the second input shaft,
the plurality of gear trains for gear positions include a plurality of first gear trains for gear positions and a plurality of second gear trains for gear positions provided between the first input shaft and the output shaft and between the second input shaft and the output shaft, and
the controller controls the plurality of switching valves to selectively switch the plurality of hydraulic pressure supply patterns for supplying hydraulic pressure to the hydraulic chamber of at least one of one of the first gear trains for gear positions and one of the second gear trains for gear positions.

3. The transmission according to claim 1, wherein
one oil passage is connected to each of a plurality of the hydraulic chambers.

4. The transmission according to claim 1, wherein
the plurality of gear trains for gear positions are seven or eight of the gear trains for gear positions.

5. The transmission according to claim 4, wherein
the plurality of switching valves are three of the switching valves.

6. The transmission according to claim 5, wherein
each switching valve includes at least one switching unit that switches communication between an input port and an output port, and
the plurality of switching valves include six of the switching units.

7. The transmission according to claim 1, wherein
the plurality of switching valves have spools having different lengths.

8. The transmission according to claim 1, wherein
a downstream side switching valve disposed on a downstream side of an oil passage connected to the hydraulic chamber of the gear train for a predetermined gear position when a predetermined hydraulic pressure supply pattern is selected is configured to move a spool to one end side of a valve body of the downstream side switching valve at a time of energization, and to maintain a position of the spool at the one end side at a time of de-energization.

9. The transmission according to claim 8, wherein the downstream side switching valve includes a fail-safe port to which hydraulic pressure supplied to the hydraulic chamber of the gear train for the predetermined gear position at the time of energization is supplied so as to bias the spool in a direction of moving to the one end side at the time of de-energization.

10. The transmission according to claim 1, further comprising:
a meshing clutch that brings each gear train for the gear position into a power transmittable state; and
a shift fork that moves the meshing clutch, wherein
when hydraulic pressure is supplied to the hydraulic chamber of one of the gear trains for a corresponding one of the gear positions, the one of the gear trains for the corresponding one of the gear positions is brought into a power transmittable state by the shift fork moving the meshing clutch.

11. The transmission according to claim 1, wherein
the plurality of gear trains for gear positions are seven or eight of the gear trains for gear positions,
the plurality of switching valves are three of the switching valves,
each switching valve includes at least one switching unit that switches communication between an input port and an output port,
the three switching valves include six of the switching units, and
the three switching valves are a first switching valve including one of the switching units, a second switching valve including two of the switching units, and a third switching valve including three of the switching units.

12. A utility vehicle with a transmission comprising:
an input shaft;
an output shaft disposed in parallel to the input shaft;
a clutch for connecting and disconnecting power from a drive source input to the input shaft;
a plurality of gear trains for gear positions provided between the input shaft and the output shaft, each gear train having a respective hydraulic chamber;
a plurality of switching valves for switching an oil passage connected to the hydraulic chambers to which hydraulic pressure for bringing each of the plurality of gear trains for gear positions into a power transmittable state is supplied;
a pressure source for generating hydraulic pressure; and
a controller for controlling the plurality of switching valves, wherein
the controller controls the plurality of switching valves so as to selectively switch a plurality of hydraulic pressure supply patterns, each hydraulic pressure supply pattern being configured to supply hydraulic pressure to the hydraulic chamber of one of the gear trains for a corresponding one of the gear positions,
hydraulic pressure is supplied to the hydraulic chamber of at least one of the gear trains for gear positions through at least two of the switching valves, and
hydraulic pressure from the pressure source is input to two different switching valves of the plurality of switching valves.

13. A transmission comprising:
an input shaft;
an output shaft disposed in parallel to the input shaft;
a clutch for connecting and disconnecting power from a drive source input to the input shaft;
a plurality of gear trains for gear positions provided between the input shaft and the output shaft, each gear train having a respective hydraulic chamber;
a plurality of switching valves for switching an oil passage connected to the hydraulic chambers to which hydraulic pressure for bringing each of the plurality of gear trains for gear positions into a power transmittable state is supplied; and
a controller for controlling the plurality of switching valves, wherein
the controller controls the plurality of switching valves so as to selectively switch a plurality of hydraulic pressure supply patterns, each hydraulic pressure supply pattern being configured to supply hydraulic pressure to the hydraulic chamber of one of the gear trains for a corresponding one of the gear positions,
hydraulic pressure is supplied to the hydraulic chamber of at least one of the gear trains for gear positions through at least two of the switching valves, and
a hydraulic circuit for the plurality of gear trains for gear positions is separate from a hydraulic circuit for the clutch.

\* \* \* \* \*